US012701449B2

(12) United States Patent　(10) Patent No.:　US 12,701,449 B2

Xu et al.　(45) Date of Patent:　Aug. 4, 2026

(54) CONFIGURATION AND REPORTING OF QUALITY OF EXPERIENCE MEASUREMENTS

(71) Applicant: Comcast Cable Communications, LLC, Philadelphia, PA (US)

(72) Inventors: Jian Xu, McLean, VA (US); Kyungmin Park, Vienna, VA (US); Esmael Hejazi Dinan, McLean, VA (US); SungDuck Chun, Fairfax, VA (US); Weihua Qiao, Herndon, VA (US); Peyman Talebi Fard, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 385 days.

(21) Appl. No.: 18/300,788

(22) Filed: Apr. 14, 2023

(65) Prior Publication Data

US 2023/0337037 A1　Oct. 19, 2023

Related U.S. Application Data

(60) Provisional application No. 63/331,340, filed on Apr. 15, 2022.

(51) Int. Cl.
H04W 4/40　　(2018.01)
H04W 24/10　　(2009.01)

(52) U.S. Cl.
CPC ................................... H04W 24/10 (2013.01)

(58) Field of Classification Search
CPC .............................. H04W 24/10; H04W 24/08
USPC ....................................................... 455/422.1
See application file for complete search history.

(56) References Cited

U.S. PATENT DOCUMENTS

2023/0156767 A1* 5/2023 Hu ...................... H04L 41/5009
370/329
2024/0188175 A1* 6/2024 Liu ...................... H04W 76/27

FOREIGN PATENT DOCUMENTS

WO　　2021/213481 A1　10/2021
WO　　2022/016401 A1　1/2022
WO　　2022005360 A1　1/2022

OTHER PUBLICATIONS

R2-2204218; 3GPP TSG-RAN WG2 Meeting #117; Electronic Meeting, Feb. 21-Mar. 3, 2022; Title: Introduction of QoE measurements in NR; Source: Ericsson.
R2-2204127; 3GPP TSG-RAN2 Meeting # 117-e; Online, Feb. 21-Mar. 3, 2022; Title: 38.300 CR for Introduction of QoE measurements in NR; Source: China Unicom, Huawei, HiSilicon.
R3-222942; 3GPP TSG-RAN WG3 Meeting #115-e; Feb. 21-Mar. 3, 2022; E-meeting; Title: CR to 38.413 on QoE measurement configuration; Source: Huawei, China Mobile, China Unicom, Ericsson, Samsung, CATT, ZTE, Nokia, Nokia Shanghai Bell.

(Continued)

*Primary Examiner* — Tanmay K Shah

(74) *Attorney, Agent, or Firm* — Banner & Witcoff, Ltd.

(57)　　　　ABSTRACT

Quality of experience (QoE) measurements associated with one or more services, as provided by a first base station, may be reported by a different base station (e.g., a second base station). QoE measurement reporting via the second base station may provide various advantages such as reduced probability of signaling overload at the first base station, increased resource availability at the first base station, uninterrupted high-priority communications via the first base station, among other advantages.

20 Claims, 27 Drawing Sheets

(56) References Cited

OTHER PUBLICATIONS

R3-222943; 3GPP TSG-RAN WG3 Meeting #115-e; Online, Feb. 21-Mar. 3, 2022; Title: Mobility Support for NR QoE Measurement Collection; Source: Ericsson, Samsung, CATT, Huawei, ZTE, Nokia, Nokia Shanghai Bell.

3GPP Rel. 11; Title: LTE-Advanced Technology Introduction; Source: Rohde & Schwarz.

3GPP TS 26.114 V17.3.0 (Dec. 2021): 3rd Generation Partnership Project; Technical Specification Group Services and System Aspects; IP Multimedia Subsystem (IMS); Multimedia Telephony; Media handling and interaction (Release 17).

3GPP TS 26.118 V17.0.0 (Jun. 2021); 3rd Generation Partnership Project; Technical Specification Group Services and System Aspects; Virtual Reality (VR) profiles for streaming applications (Release 17).

3GPP TS 26.247 V16.5.1 (Dec. 2021); 3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 16).

3GPP TR 26.929 V16.1.0 (Sep. 2019); 3rd Generation Partnership Project; Technical Specification Group Services and System Aspects; QoE parameters and metrics relevant to the Virtual Reality (VR) user experience (Release 16).

3GPP TS 28.404 V17.0.0 (Sep. 2021); 3rd Generation Partnership Project; Technical Specification Group Services and System Aspects; Telecommunication management; Quality of Experience (QoE) measurement collection; Concepts, use cases and requirements (Release 17).

3GPP TS 28.405 V17.0.0 (Dec. 2021); 3rd Generation Partnership Project; Technical Specification Group Services and System Aspects; Telecommunication management; Quality of Experience (QoE) measurement collection; Control and configuration (Release 17).

3GPP TS 28.406 V16.0.0 (Jul. 2020); 3rd Generation Partnership Project; Technical Specification Group Services and System Aspects; Telecommunication management; Quality of Experience (QoE) measurement collection; Information definition and transport (Release 16).

3GPP TS 28.533 V17.1.0 (Dec. 2021); 3rd Generation Partnership Project; Technical Specification Group Services and System Aspects; Management and orchestration; Architecture framework (Release 17).

3GPP TS 28.622 V17.0.0 (Dec. 2021); 3rd Generation Partnership Project; Technical Specification Group Services and System Aspects; Telecommunication management; Generic Network Resource Model (NRM) Integration Reference Point (IRP); Information Service (IS) (Release 17).

3GPP TS 28.623 V17.0.0 (Dec. 2021); 3rd Generation Partnership Project; Technical Specification Group Services and System Aspects; Telecommunication management; Generic Network Resource Model (NRM) Integration Reference Point (IRP); Solution Set (SS) definitions (Release 17).

3GPP TR 36.805 V0.2.0 (Mar. 2009); 3rd Generation Partnership Project; Technical Specification Group Radio Access Network; Study on Minimization of drive-tests in Next Generation Networks; (Release 9).

R3-211012; 3GPP TSG-RAN WG3 Meeting #111-e; E-meeting, Jan. 25-Feb. 4, 2021; Source: Nokia (moderator); Title: CB: # NRQoE2-Mobility—Summary of email discussion.

Network Architectures and Services (NET Aug. 1, 2013); Proceesings of the Seminars Future Internet (FI) and Innovative Internet Technologies and Mobile Communications (IITM); Munich, Germany; Oct. 17, 2013-Feb. 16, 2014; Author: Georg Carle, Daniel Raumer, Lukas Schwaighofer; Source: Chair for Network Architectures and Services Department of Computer Science.

R2-2100995; 3GPP TSG-RAN WG2 Meeting #113 electronic; Online, Jan. 25-Feb. 5, 2021; Source: LG Electronics Inc.; Title: QoE measurements in NR.

R2-2202019; 3GPP TSG-RAN WG2 Meeting #116bis-e; Electronic Meeting, Jan. 17-25, 2022; Title: Running CR for Introduction of QoE measurements in NR; Source: Ericsson.

R3-206535; 3GPP TSG-RAN WG3 #110-e; Nov. 2-12, 2020 online; Source: China Telecom; Title: Further Consideration on QOE Configuration and Report.

R3-210772; 3GPP TSG-RAN WG3 #111-e; Jan. 25-Feb. 4, 2021 Online; Source: CATT; Title: Discussion on RAN visible QoE configuration and reporting.

R3-211732; 3GPP TSG-RAN WG3 Meeting #112e; E-Meeting: May 17-May 27, 2021; Source: Qualcomm Inc.; Title: NR QoE configuration and reporting.

R3-212435; 3GPP TSG-RAN WG3 #112-e; May 17-28, 2021 Online; Source: ZTE, China Telecom; Title: Discussion on NR QoE Configuration.

R3-220074; 3GPP TSG-RAN3 Meeting # 114bis-e; Online, Jan. 17-26, 2022; Title: 38.300 BL CR for Introduction of QoE measurements in NR; China Unicom, Ericsson, ZTE, Huawei, Nokia, Nokia Shanghai Bell, Samsung.

R3-220080; 3GPP TSG-RAN WG3 Meeting #114bis-e; Jan. 17-26, 2022, E-meeting; Title: CR to 38.413 on QoE measurement configuration; Source: Huawei, China Mobile, China Unicom, Ericsson, Samsung.

TSGS#71(16)0082; 3GPP TSG SA Meeting #71; Gothenburg, Sweden, Mar. 9-11, 2016; Source: Huawei, CMCC, Expway, Samsung, Intel, HiSilicon, ChinaTelecom, China Unicom, Deutsche Telecom AG, Qualcomm, Ericsson LM, One2many; Title: Draft WID of Improved Streaming QoE Reporting in 3GPP Services and Networks.

SP-200193; 3GPP TSG-SA Meeting #87e; e-meeting, Mar. 17-20, 2020 ; Source: SA WG5; Title: New WID on Enhancement of QoE Measurement Collection.

* cited by examiner

FIG. 5B

Uplink

FIG. 5A

Downlink

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

CONFIGURATION AND REPORTING OF QUALITY OF EXPERIENCE MEASUREMENTS

CROSS-REFERENCE TO RELATED APPLICATIONS

This application claims the benefit of U.S. Provisional Application No. 63/331,340, filed on Apr. 15, 2022. The above-referenced application is hereby incorporated by reference in its entirety.

BACKGROUND

A communication network determines performance metrics associated with various services provided by the network. A communication device (e.g., a wireless device, base station, etc.) determines and/or reports various performance metrics associated with one or more services.

SUMMARY

The following summary presents a simplified summary of certain features. The summary is not an extensive overview and is not intended to identify key or critical elements.

A base station may provide one or more services for a wireless device in a wireless network. Measurements may be performed to determine a quality of experience (QoE) associated with one or more services provided by the base station. The measurements may be reported by the wireless device to assist the network in improving network performance and/or user experience. The measurements may be reported via a second base station that may be different from a first base station providing one or more services to the wireless device. Measurement reporting using the second base station may be configured by the first base station using one or more messages between the base stations, or between the first base station and the wireless device. Measurement reports from the wireless device that are received by the second base station may be sent/transferred to the first base station (e.g., via a backhaul link). By using the second base station for measurement reporting, advantages may be achieved such as reduced signaling overload by the first base station and/or improved ability of the first base station to provide uninterrupted high-priority communications.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.

FIG. 5B shows an example mapping for uplink channels.

FIG. 7 shows an example configuration of a frame.

FIG. 18 shows an example of management-based activation and deactivation of measurement reporting.

DETAILED DESCRIPTION

Figures 1A, 1B:
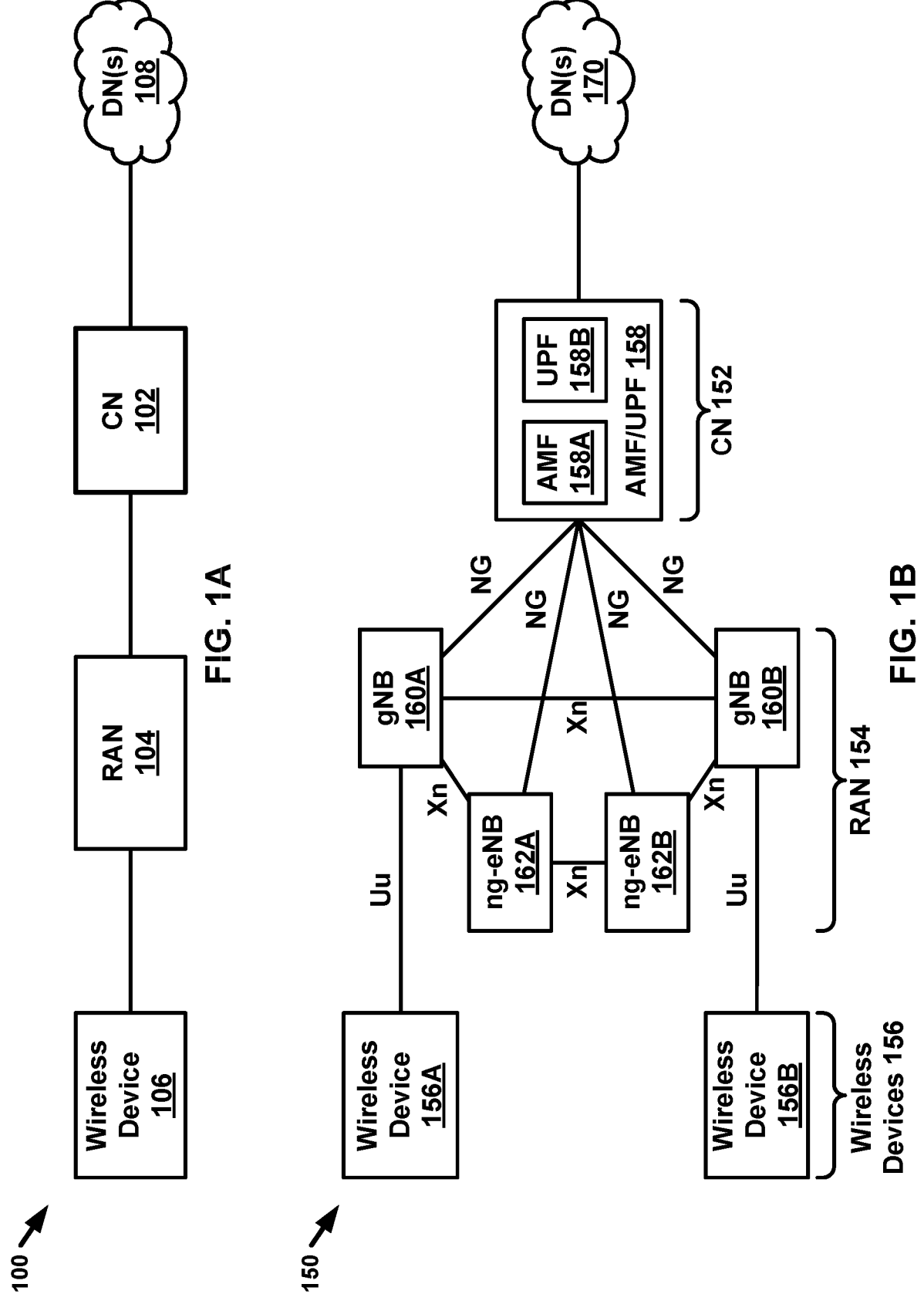
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to signaling for measurement and reporting of communication performance metrics.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with new radio (NR) and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hot-spots") or in areas with a weak macrocell coverage. Examples of small cell base stations may comprise, in order of decreasing coverage area, microcell base stations, pico-cell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNS (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNS, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162)

may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
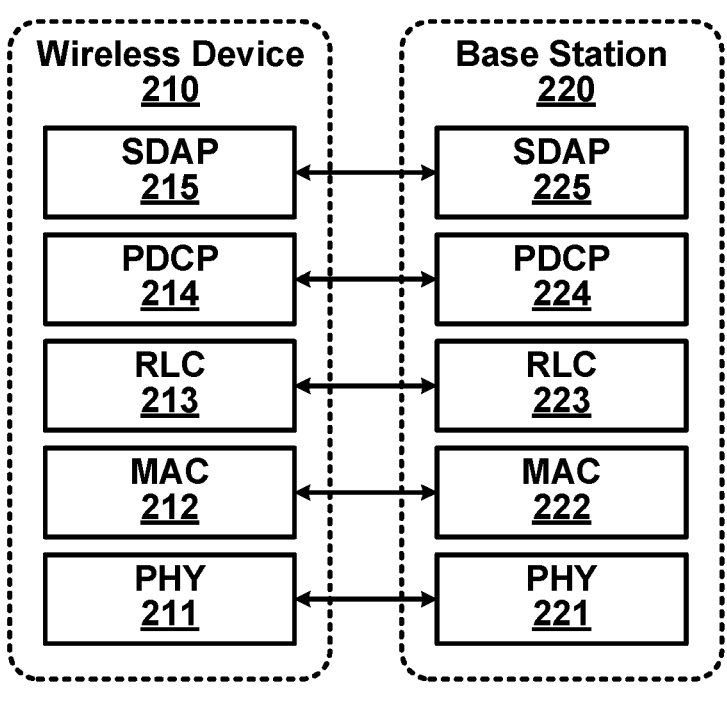
FIG. 2A shows an example user plane.
Figure 2B:
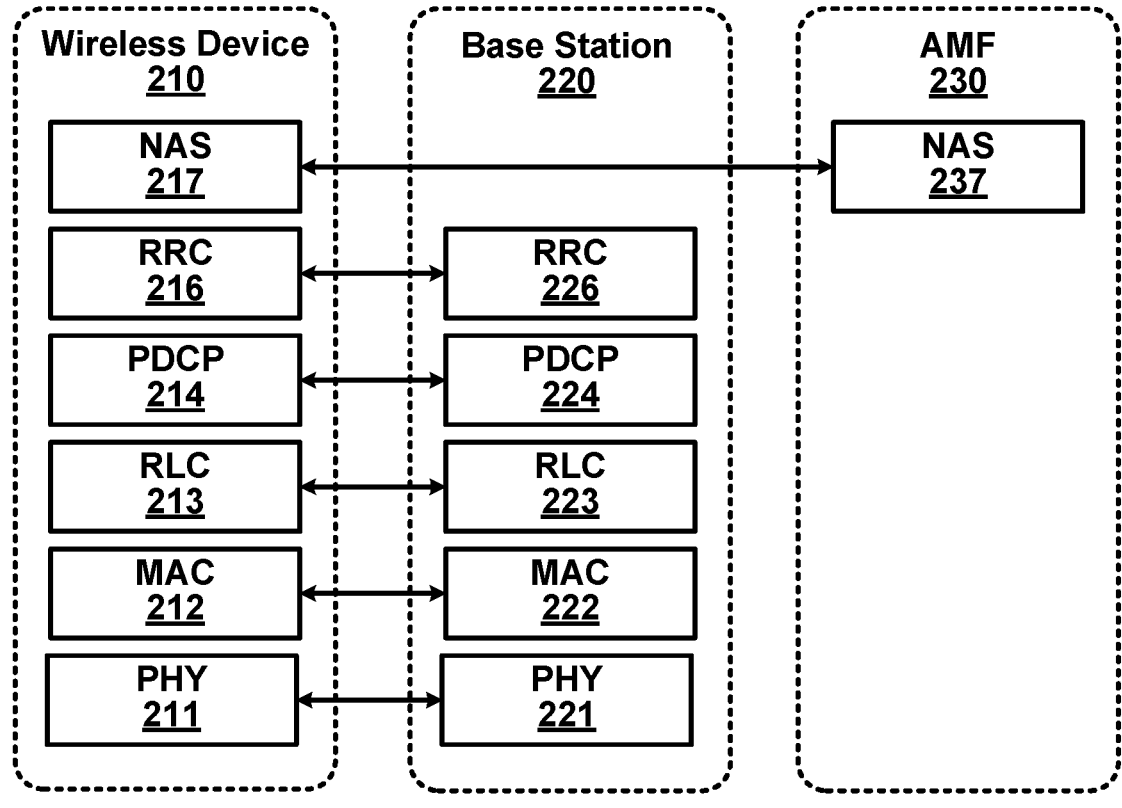
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model.

The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
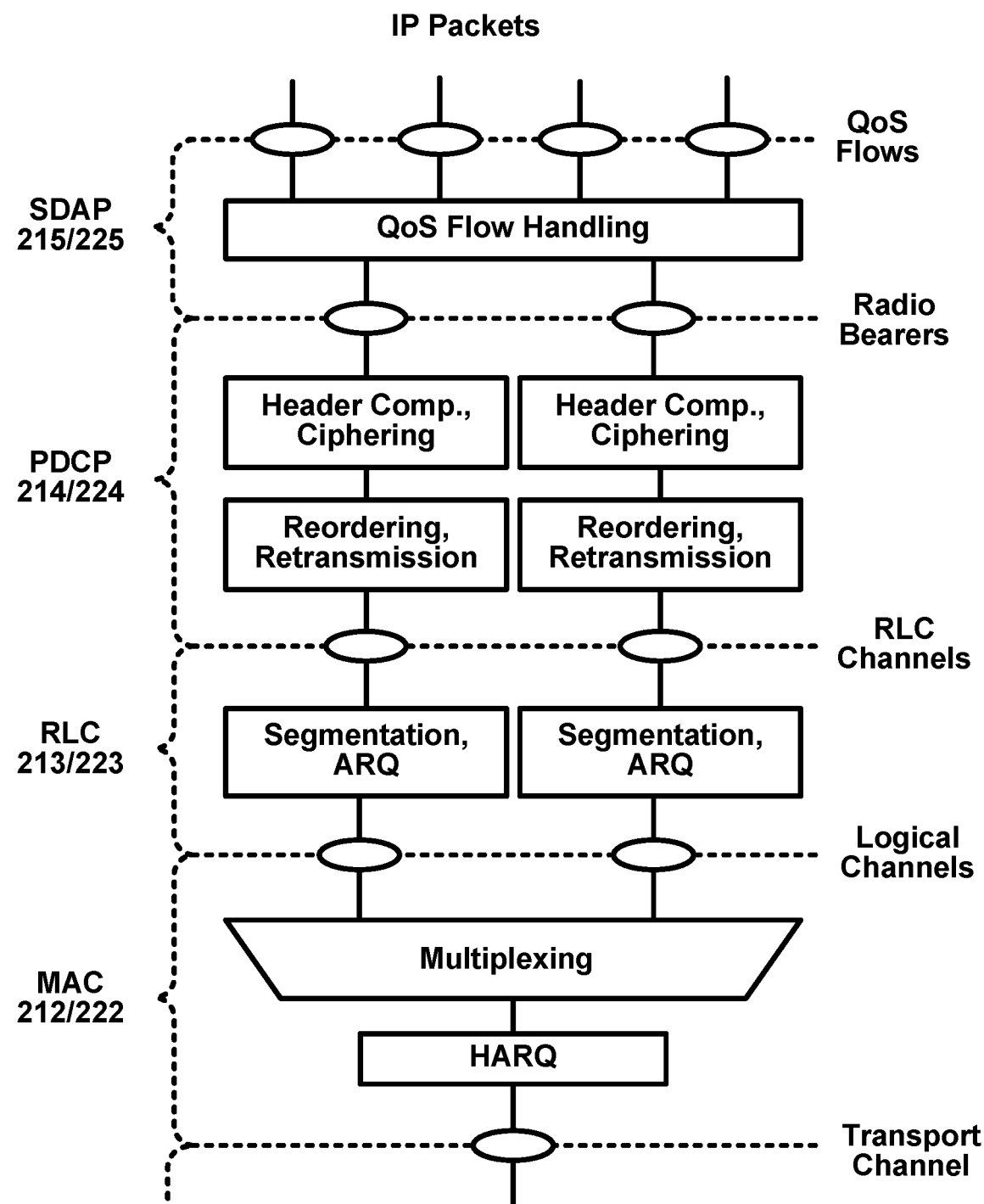
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
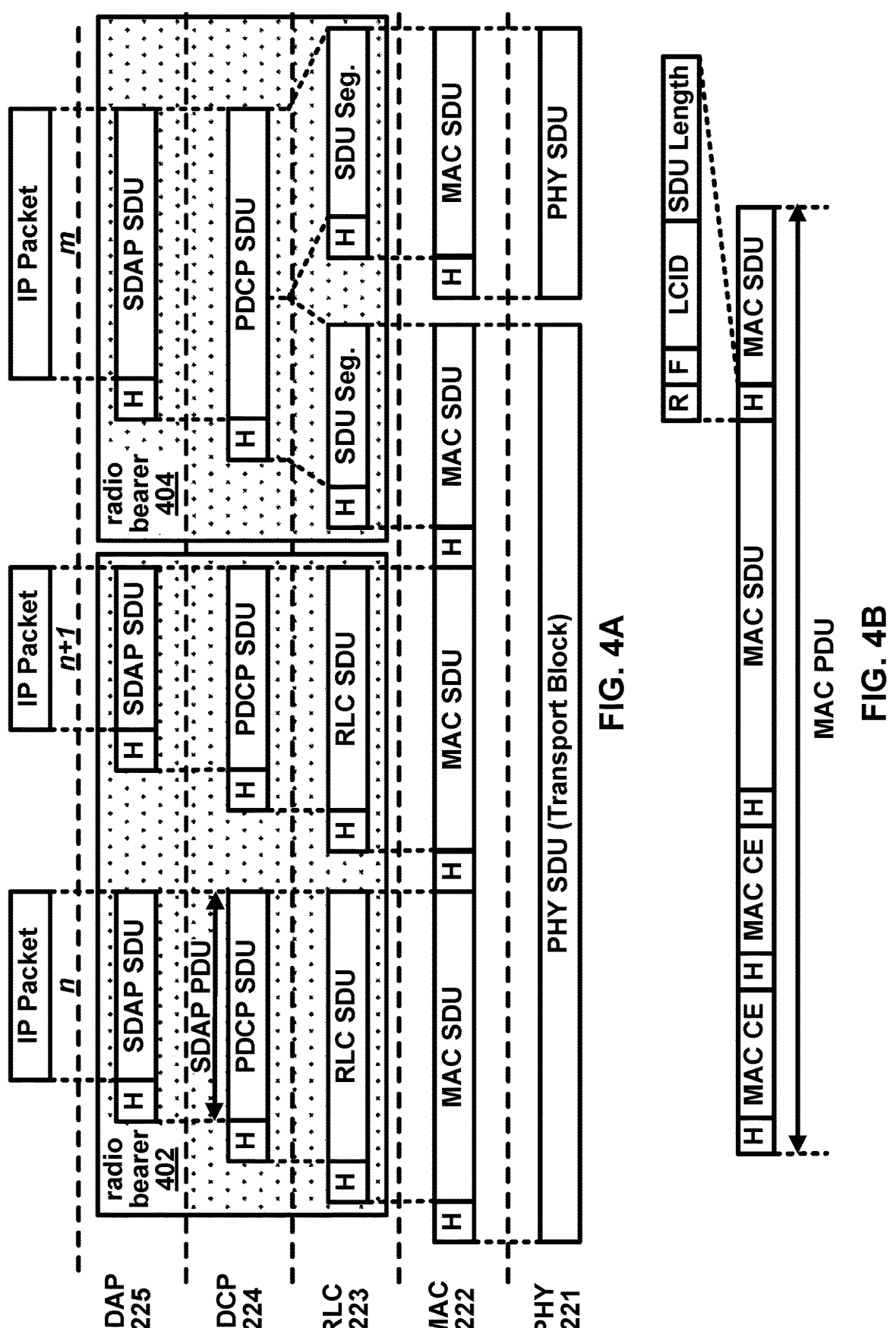
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration) . The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use. One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
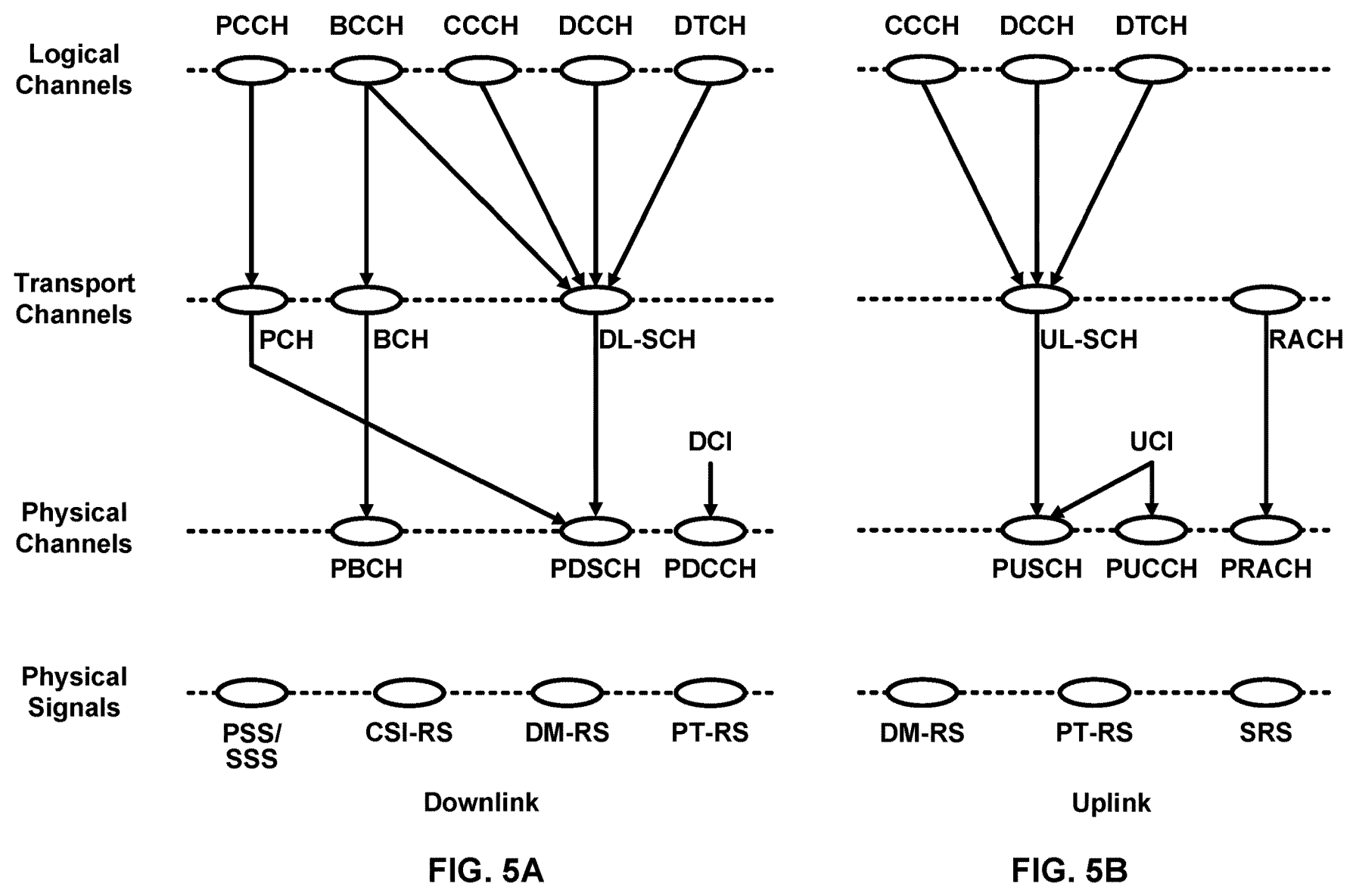

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane protocol stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
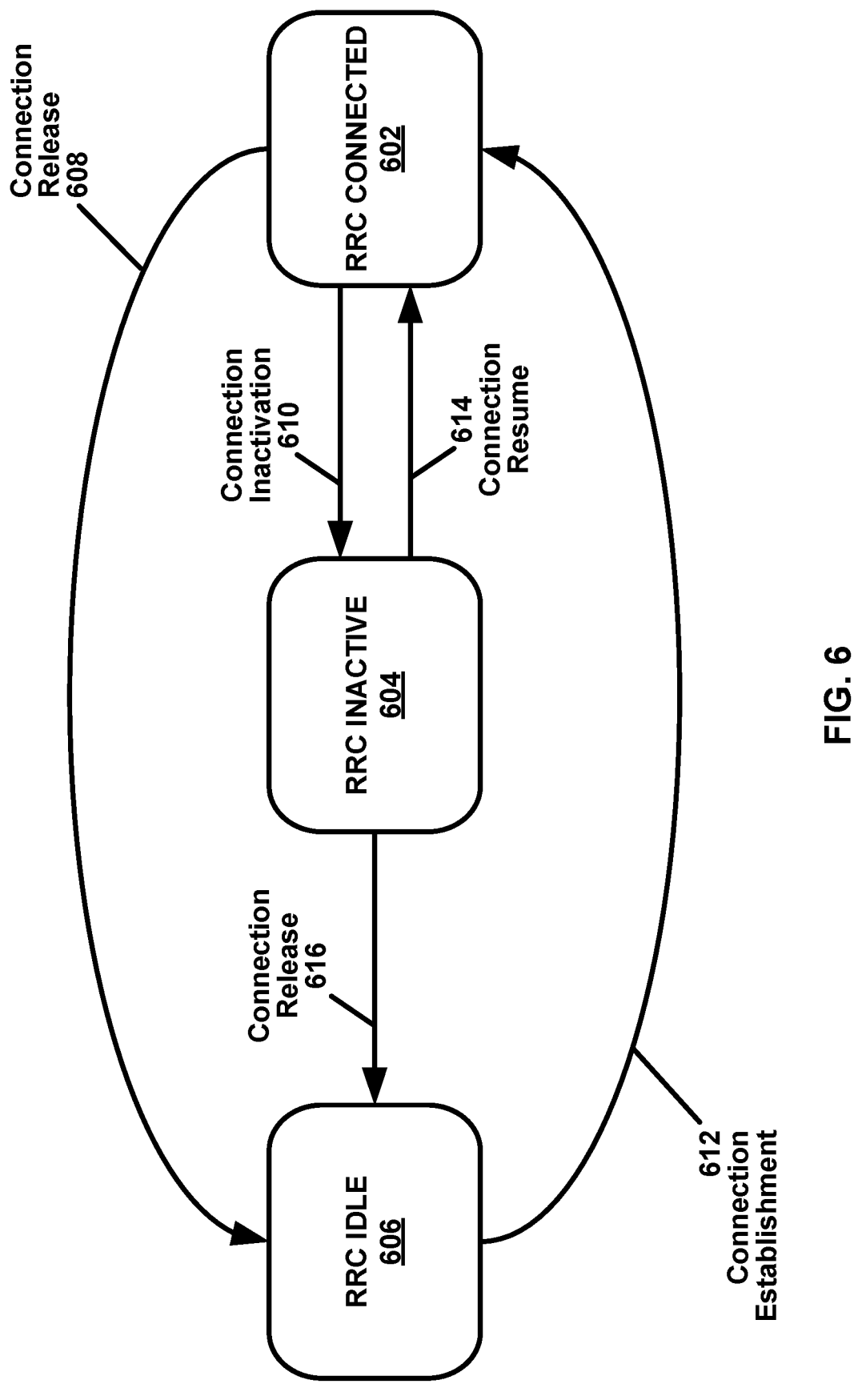
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by a RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
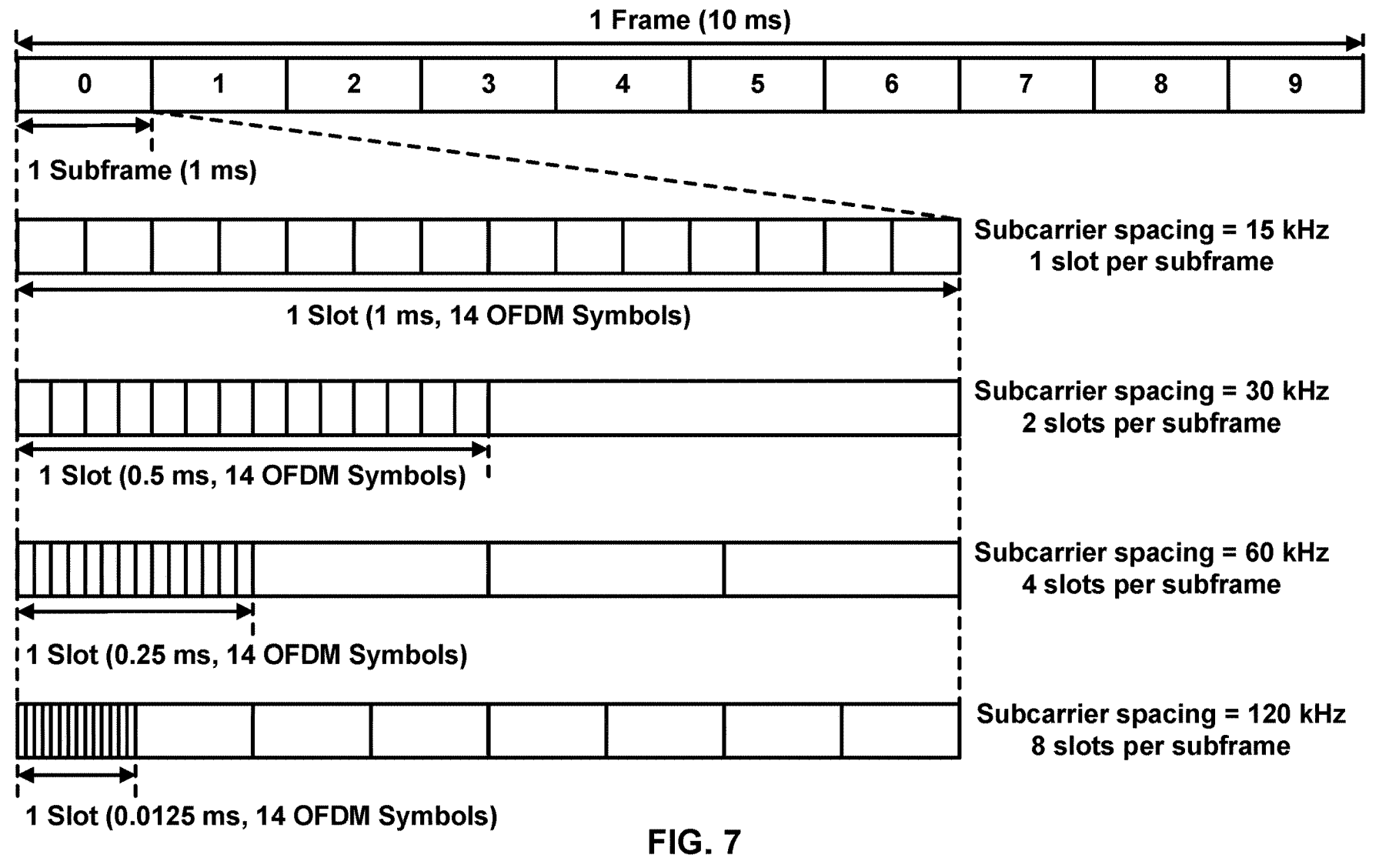

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
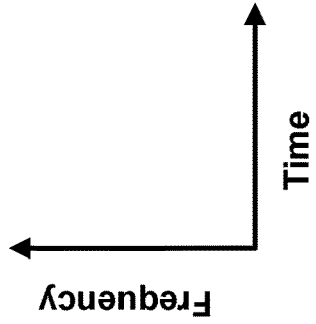
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
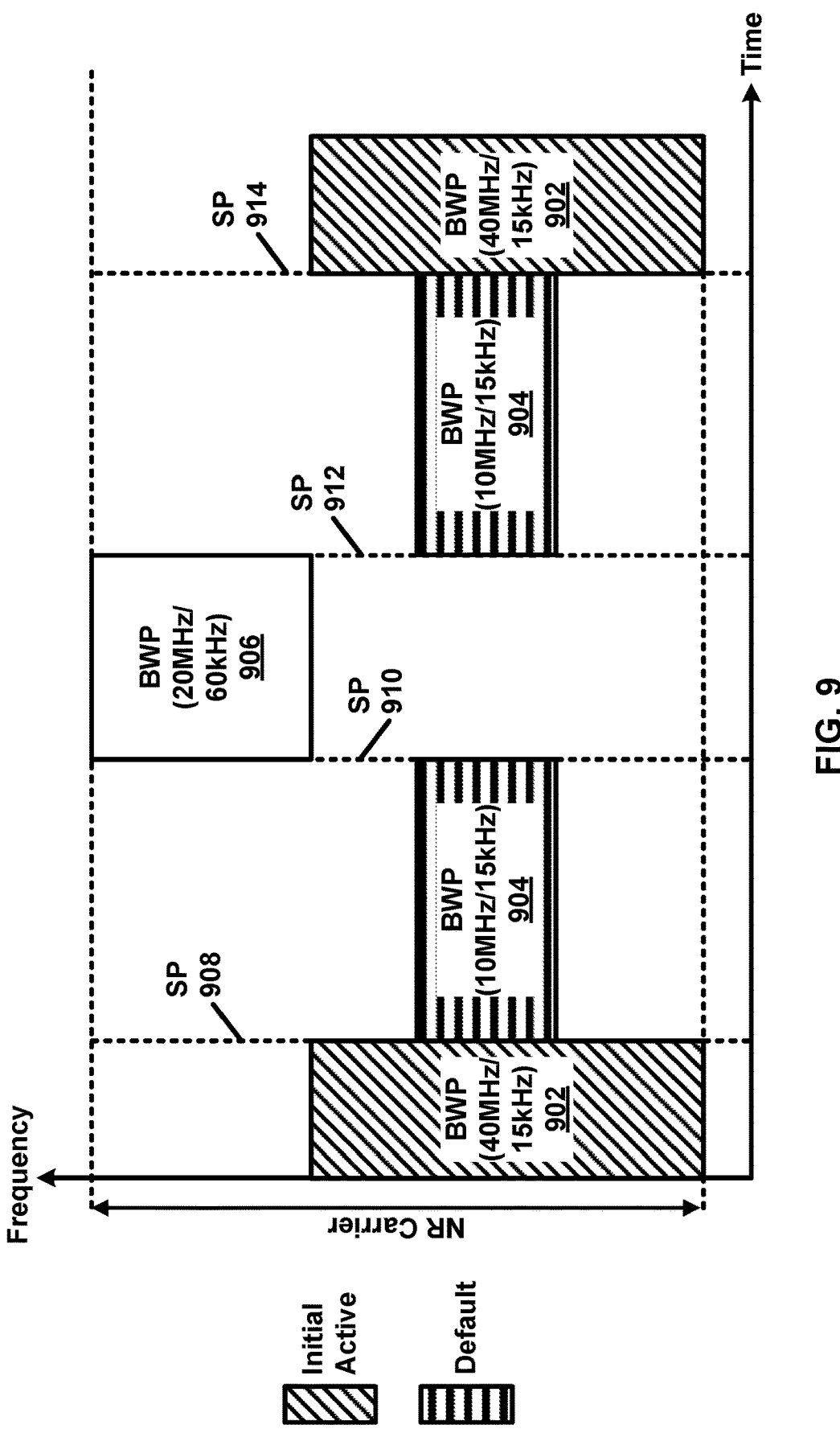
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
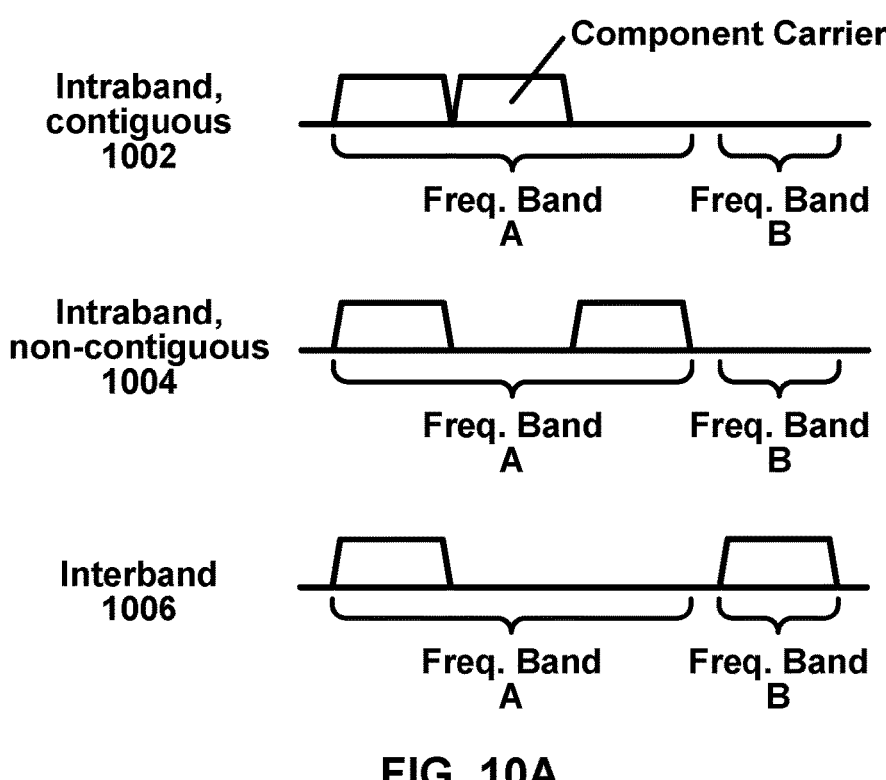
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
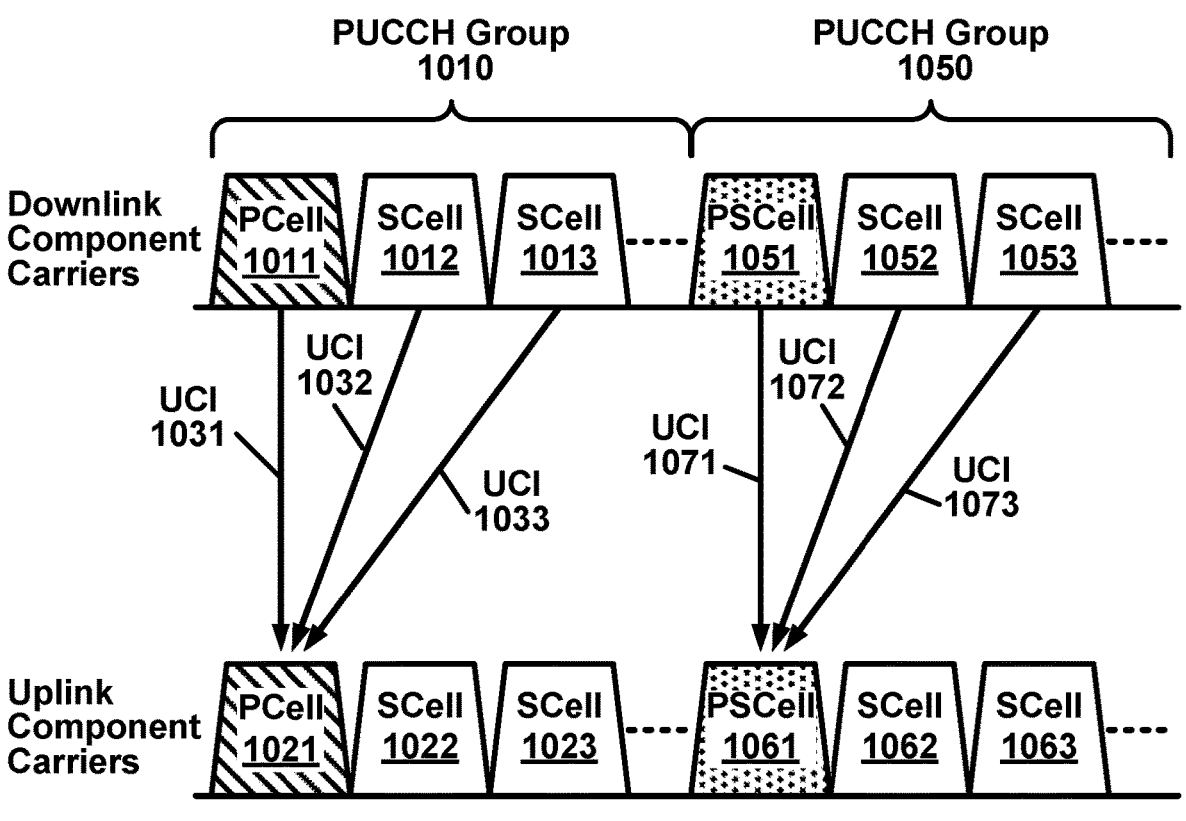
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSS) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
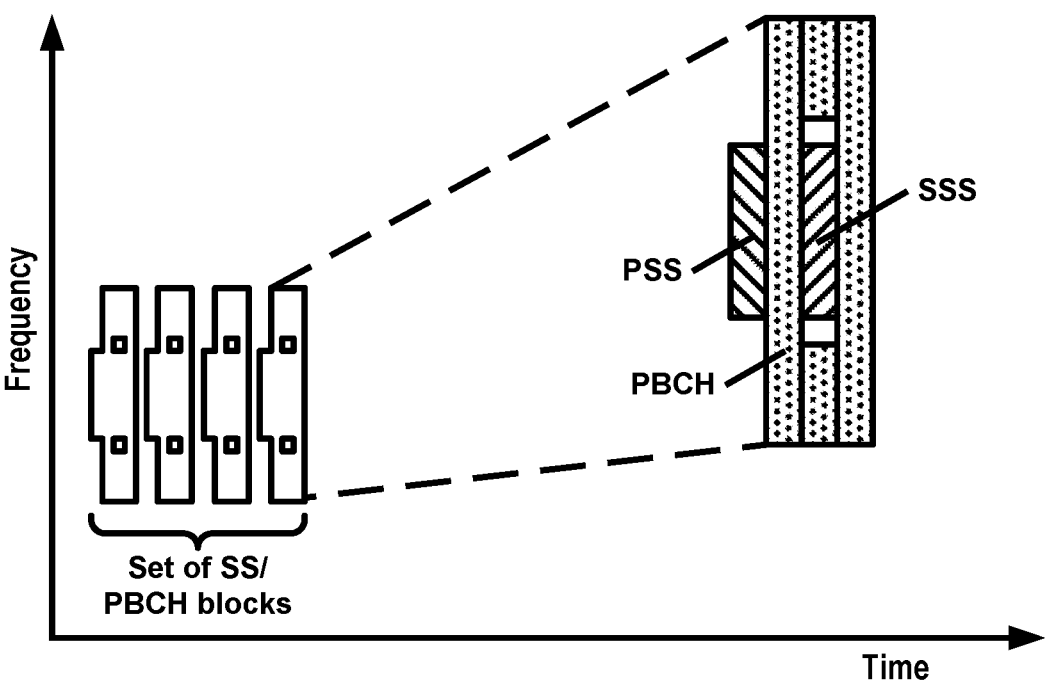
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
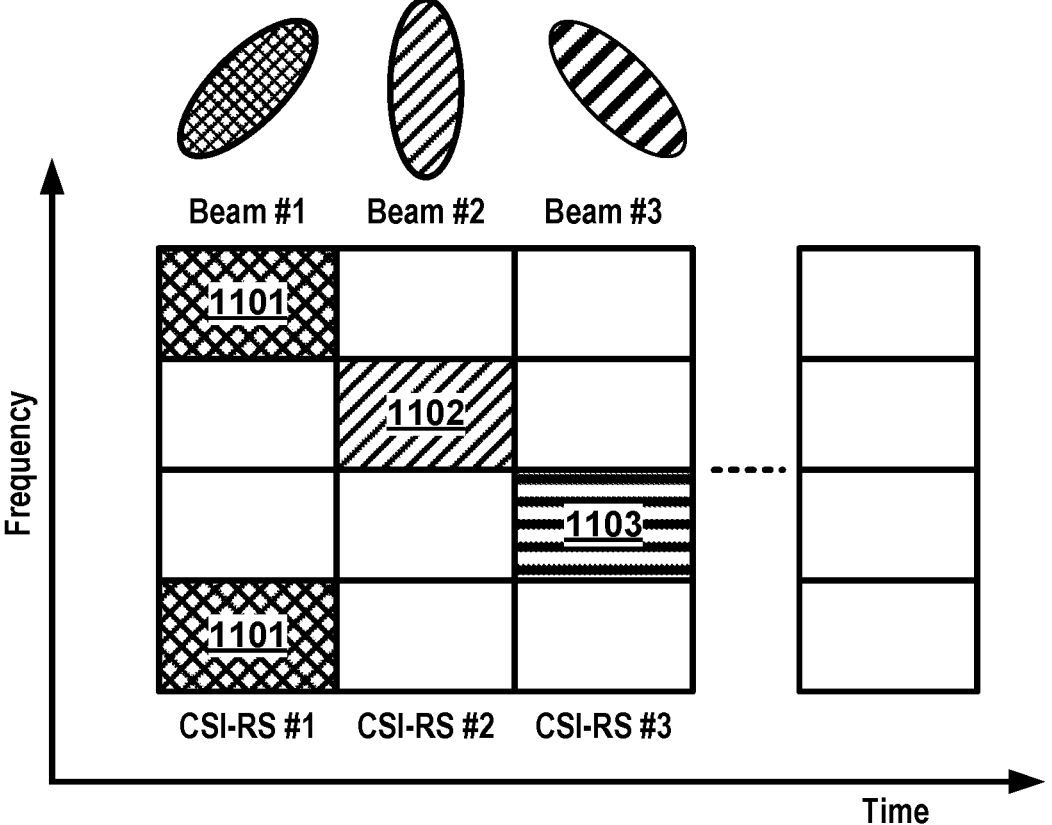
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figures 12A, 12B:
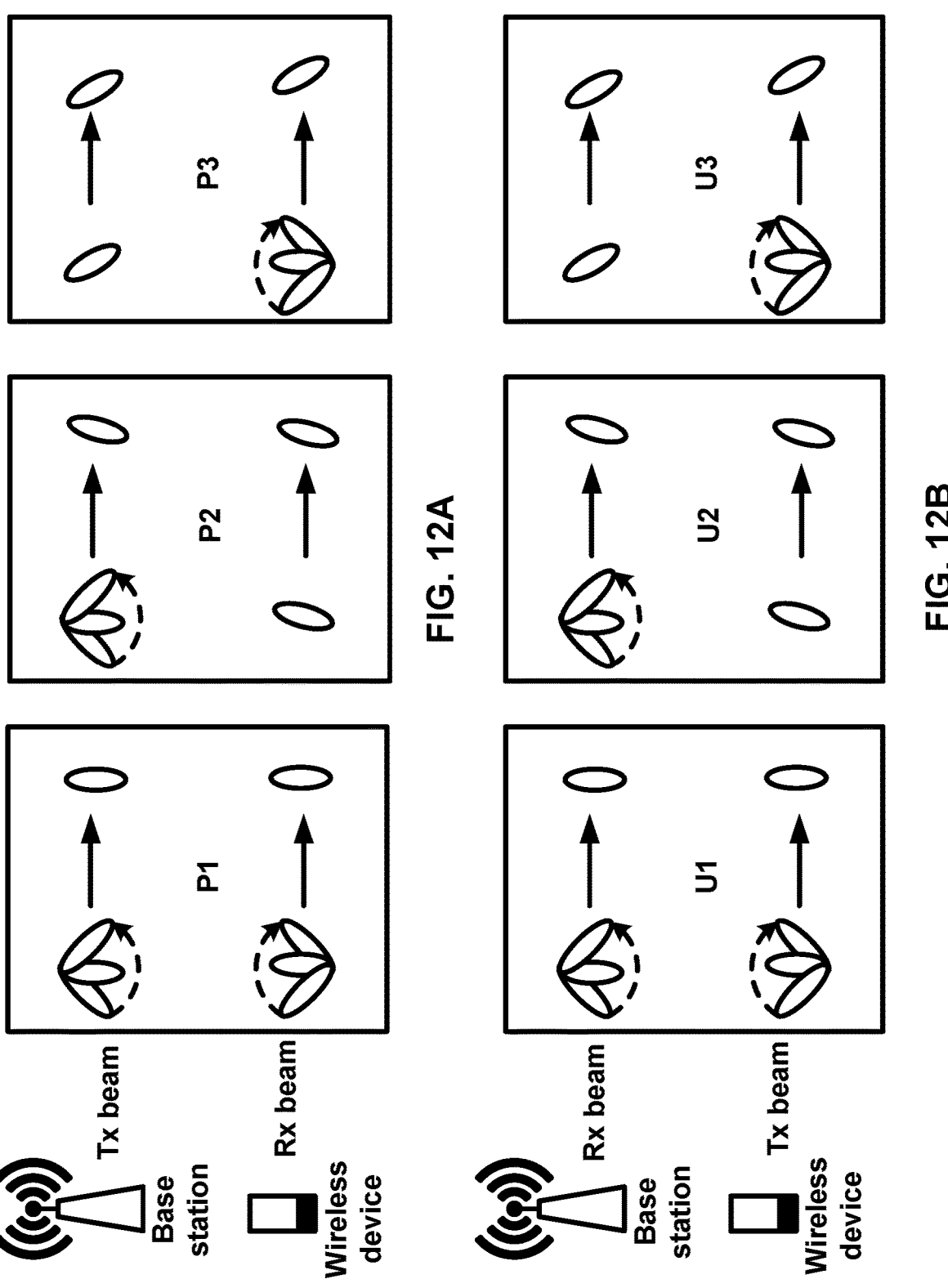
FIG. 12A shows examples of downlink beam management procedures.
FIG. 12B shows examples of uplink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows).

Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beam-forming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
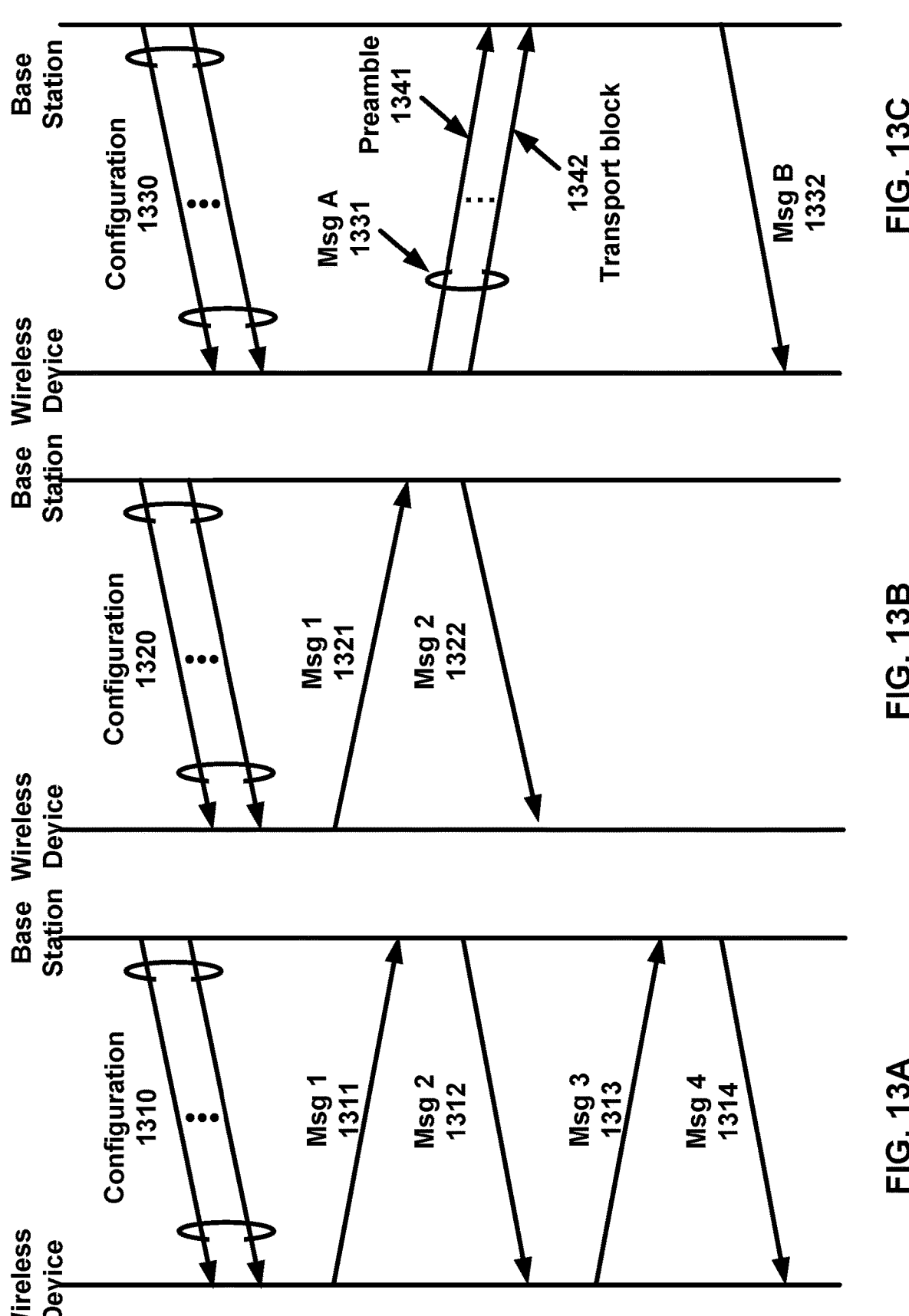
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-Occa-sionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTrans-Max) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-Response Window) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1

1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/ starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/ transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step, contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-Response Window) to monitor a PDCCH for the RAR, for example, based on (e.g., after or in response to) sending/ transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/ or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
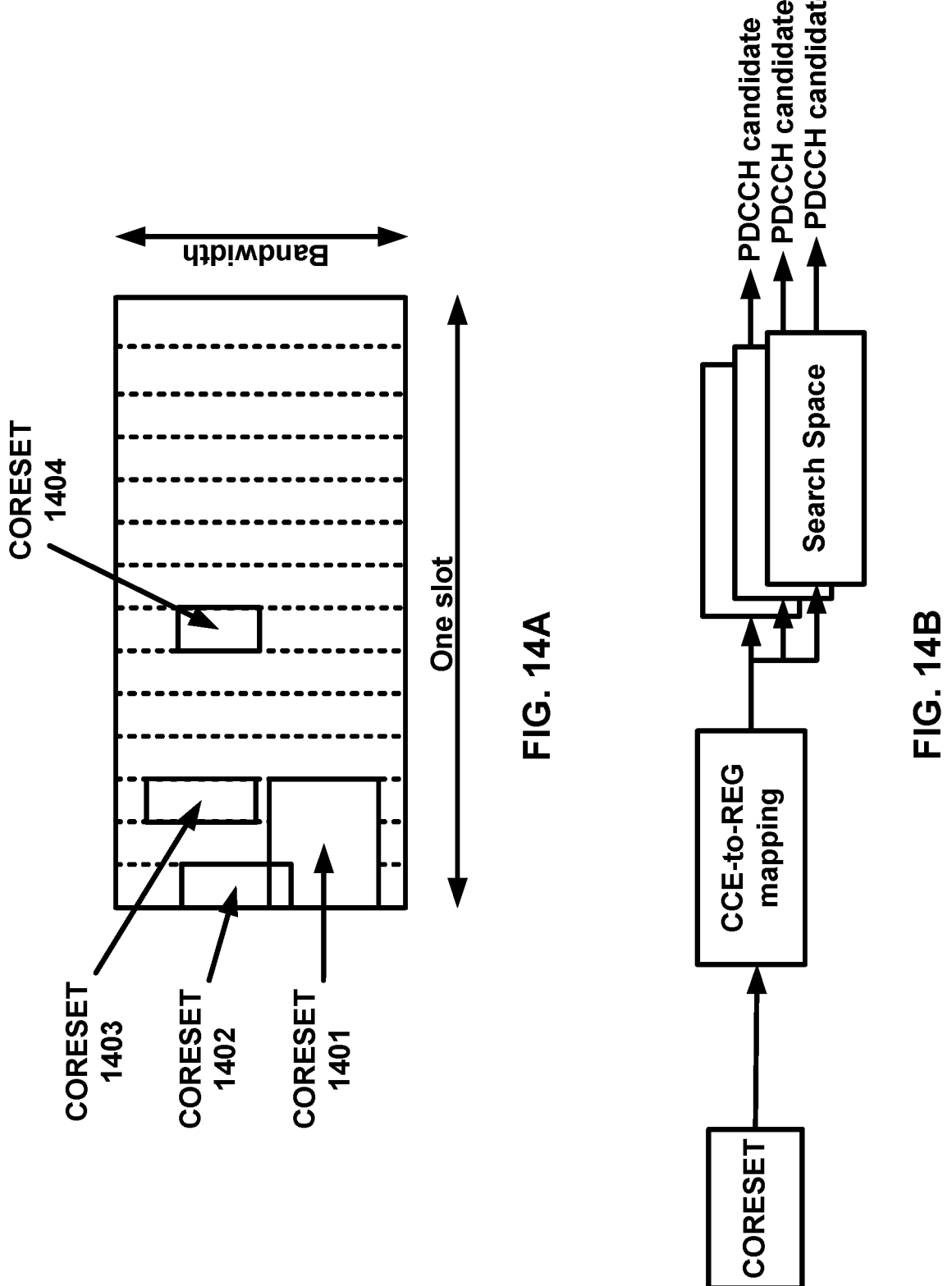
FIG. 14A shows an example of control resource set (CORESET) configurations.
FIG. 14B shows an example of a control channel element to resource element group (CCE-to-REG) mapping.

FIG. 14A shows an example of CORESET configurations. The CORESET configurations may be for a bandwidth part or any other frequency bands. The base station may send/ transmit DCI via a PDCCH on one or more control resource sets (CORESETs). A CORESET may comprise a time-frequency resource in which the wireless device attempts/ tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORE-SET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitat-ing interference coordination and/or frequency-selective transmission of control channels). The base station may perform different or same CCE-to-REG mapping on differ-ent CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configura-tion parameters of one or more CORESETs and one or more search space sets. The configuration parameters may indi-cate an association between a search space set and a CORE-SET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set.

The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multiantenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
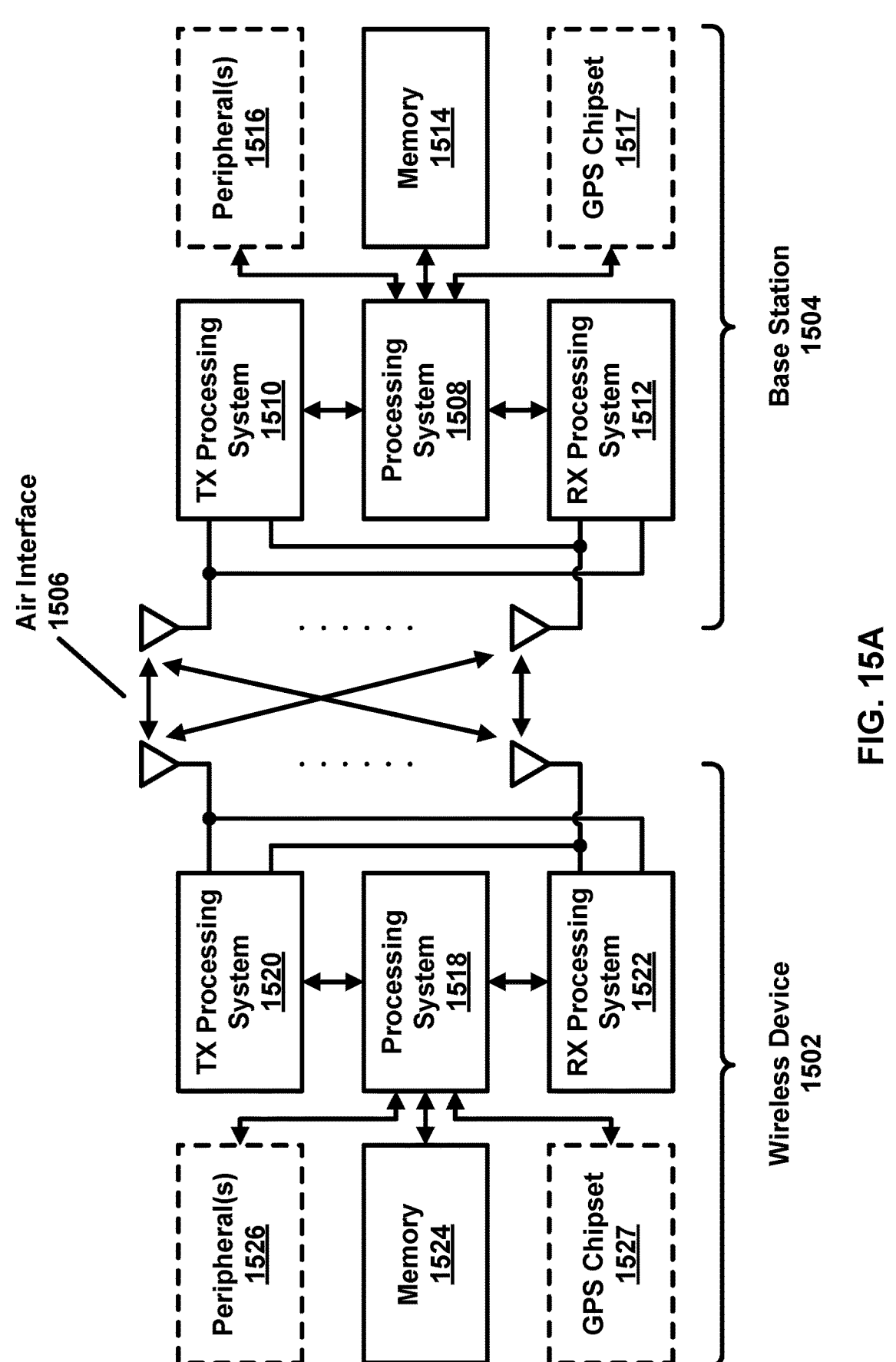
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
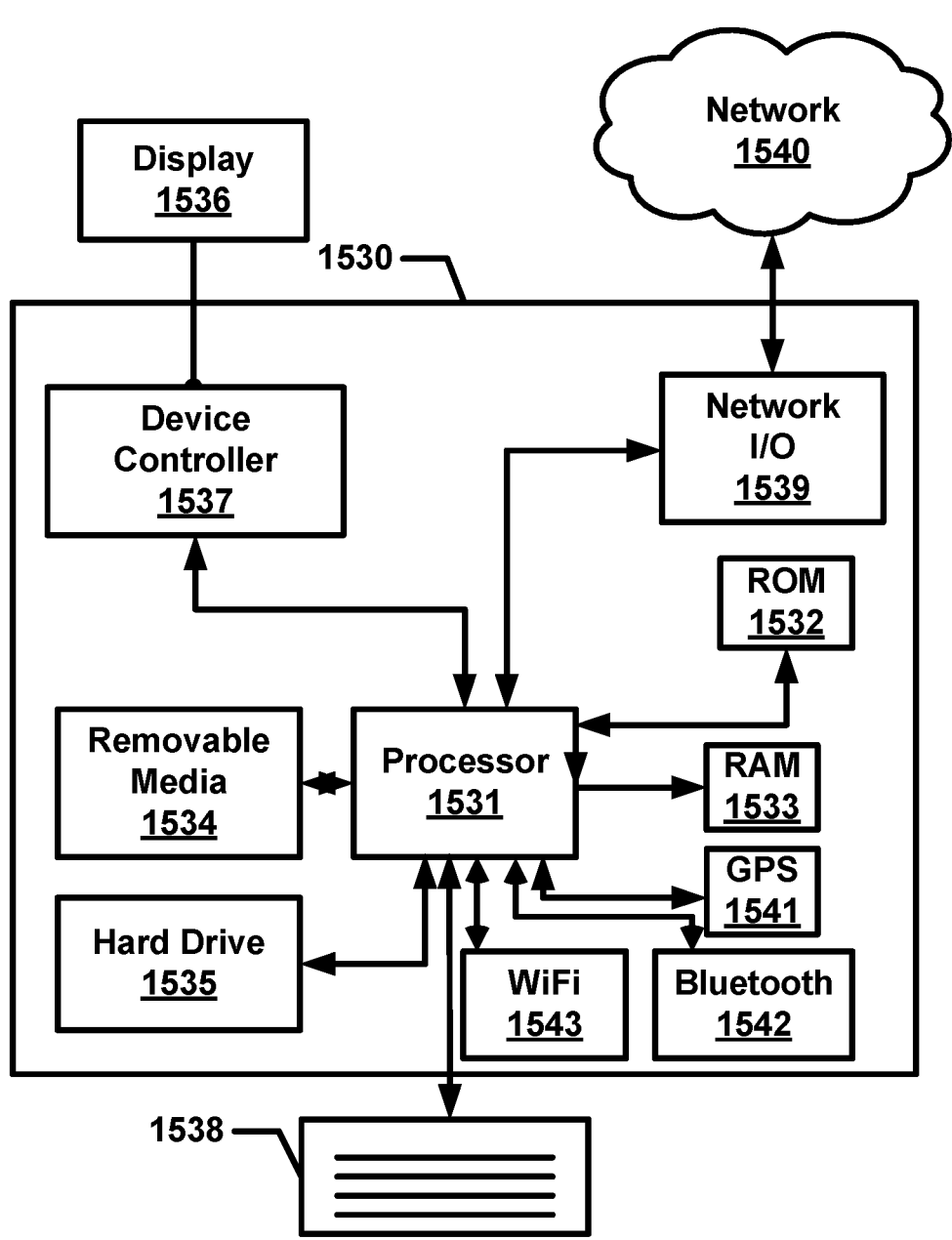
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figures 16A, 16B, 16C, 16D:
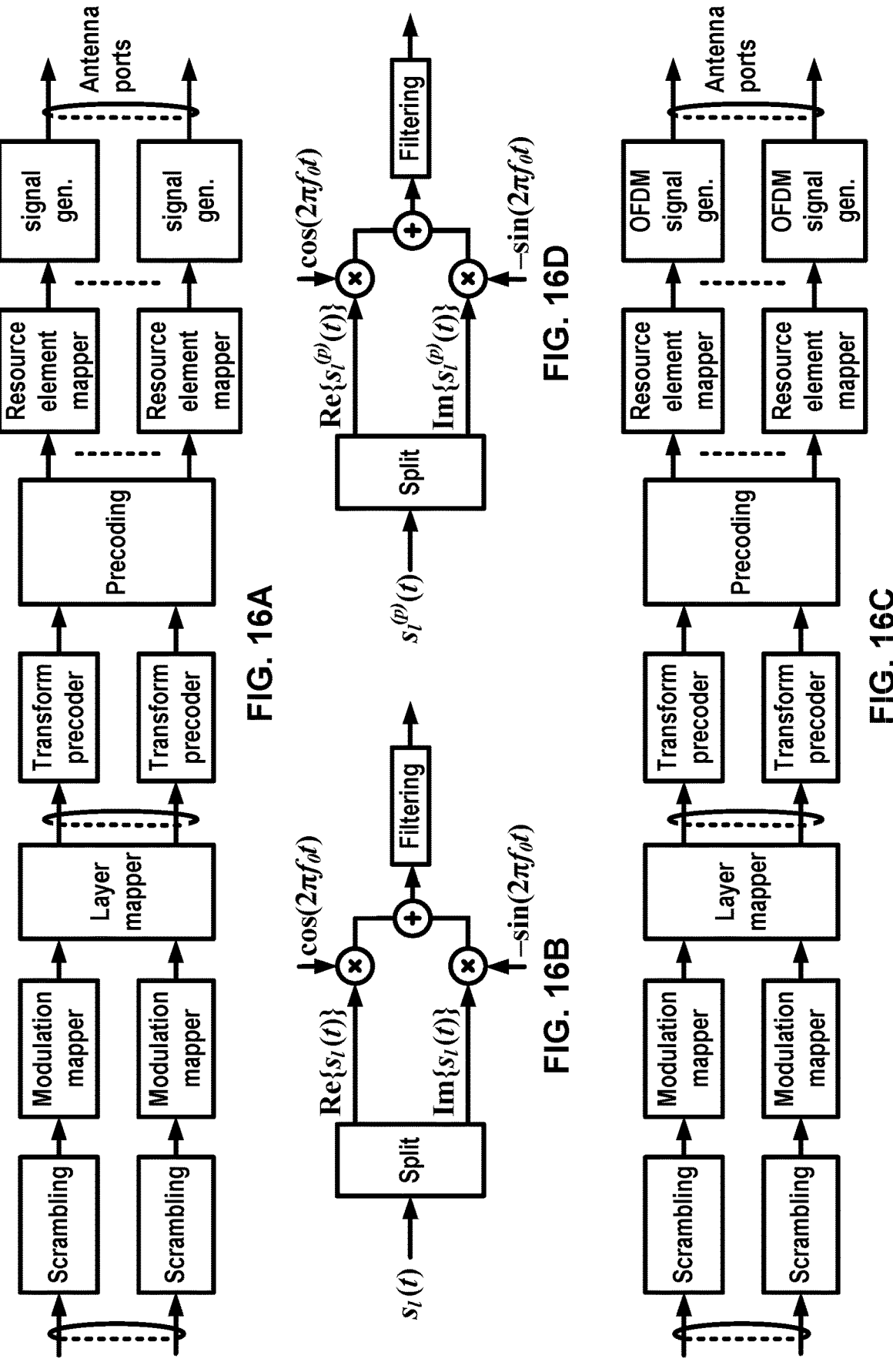
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Wireless communications (e.g., using 5G technology, 3GPP Release 16, earlier/later 3GPP releases or generations, LTE technology, 6G technology, and/or other technology) may provide services for wide range of applications (e.g., across industries and/or users). In some scenarios, QoS requirements and/or fulfilment may not be sufficient to provide sufficient/acceptable user experience for all user requirements. It may be advantageous to determine one or more metrics for fulfilling different user requirements. The one or more other metrics may comprise user key performance indicators (KPI) information (e.g. application layer end-to-end reliability statistic indicator) and/or any other indicators. KPIs may be used for indicating/characterizing insufficient video streaming performance (e.g., as perceived by the user). Insufficient video streaming performance may comprise initial stalling of the playout, periods of stalling and freezing of the video while playing, interruption of the audio while playing, low coding quality (e.g., appearing as blurring, macroblocking or mosquito artefacts), and/or varying coding quality while playing. KPIs and other information may be collected (e.g., by a network; an entity associated with the network, such as a measurement collection entity (MCE); etc.). Collected information (e.g., metrics) may be used to determine and/or manage the user's quality of experience (QoE). QoE support may be useful for any service type and/or applications (e.g., streaming services, multimedia telephony services for IP multimedia system (IMS) (MTSI), multimedia broadcast and multicast services (MBMS), augmented reality (AR), virtual reality (VR), extended reality (XR), video streaming services, etc.). Additional metrics (e.g., radio related measurements, information to assist the NR QoE management functionality, etc.) may be determined.

Wireless communications (e.g., new radio (NR), LTE, other releases/generations/technologies of wireless communication) may support an application layer measurement collection functionality for QoE. Application layer measurement collection functionality may enable the collection of application layer measurements from wireless device(s) (a UE), or one or more UEs) in an area. The collected information may be sent/transmitted to a collection center (e.g., MCE, or any other entity) for further processing (e.g., analysis).

Initiation of measurement collection (e.g., application layer measurement collection) may be signaling-based or management-based. Measurement collection, for signaling-based measurement collection, may be initiated by core network (CN) nodes (e.g., mobility management function, AMF, mobility management entity (MME), SMF, etc). Measurement collection, for management-based measurement collection, may be initiated by operations, administration, and maintenance (OAM) processes/functions. An OAM function/process (e.g., hereinafter, referred to as OAM) may be specific for a particular wireless device and/or may target an area (e.g., comprising any quantity of wireless devices). An application layer measurement configuration may be encapsulated (e.g., in a transparent container). The encapsulated application layer measurement configuration may be forwarded to a wireless device via a downlink message (e.g., downlink RRC message, or any other downlink message). Application layer measurements (e.g., as received from higher layer(s) of a wireless device) may be encapsulated (e.g., in a transparent container) and sent to the network (e.g., via an uplink RRC message, or any other uplink message).

Figure 17:
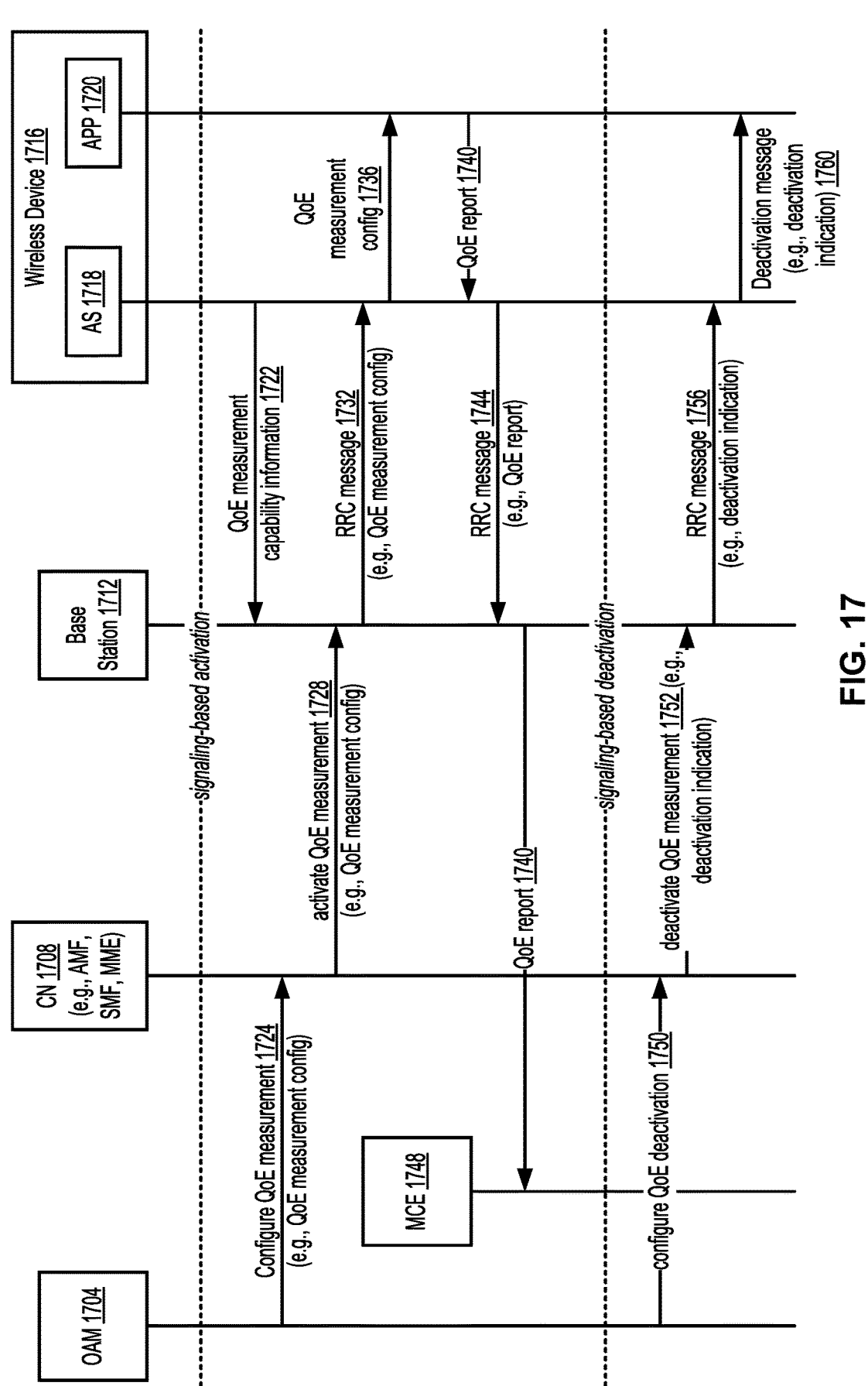
FIG. 17 shows an example of signaling-based activation and deactivation of measurement collection.

FIG. 17 shows an example of signaling-based activation and deactivation of measurement collection. Measurements (e.g., QoE measurements), in signaling-based activation procedures, are intended for one or more subscribers. An OAM 1704 and/or CN 1708 may select a wireless device 1716 based on subscription information and capability of the wireless device 1716. The wireless device 1716 may send QoE measurement capability information 1722 to a base station 1712 (e.g., NG-RAN, gNB, eNB, etc.). The base station 1712 may send the received QoE measurement capability information 1722 to the OAM 1704 and/or the CN 1708.

The OAM 1704 may send, to the CN 1708, a message 1724 (e.g., comprising QoE measurement configuration parameters and/or information) to configure QoE measurement. The CN 1708 may initiate activation of QoE measurement (e.g., as configured by the OAM 1704). The CN 1708 may send a message 1728 (e.g., comprising the QoE measurement configuration parameters and/or information) to the base station 1712. The CN 1708 may send the message 1728 to activate the QoE measurement. Sending of the message 1724 and the message 1728 may be based on receiving the QoE measurement capability information 1722 from the wireless device 1716.

The QoE measurement configuration parameters and/or information may comprise/indicate at least one of: a container for/comprising application layer measurement configuration, a measurement configuration application layer indicator/identifier, a list of cell indicators/identifiers for QoE measurement configuration (QMC), a list of tracking area indicators/identities (TAIs) for the QMC, a list of public land mobile networks (PLMNs) for QMC, a service type of a service of the wireless device (e.g., the wireless device 1716) associated with the QMC, a QoE reference, an MCE IP address, a list of single network slice selection assistance information (S-NSSAIs) associated with the QMC, and/or the like.

The service type of the service of the wireless device associated with QMC may comprise at least one of: a streaming service, a multimedia telephony service for IMS (MTSI) service, a virtual reality (VR) service, an extended reality (XR) service, a multimedia broadcast and multicast service (MBMS), a multicast broadcast service (MBS), and/or the like. Application layer measurement configuration parameters (e.g., associated with the application layer measurement configuration) may comprise (e.g., configuration parameters for) at least one of: an average throughput of streaming services and/or VR services, an initial playout delay of streaming services and/or VR services, a buffer level status streaming services and/or VR services, a list of playback periods (e.g., play list) of streaming services and/or VR services, a successive loss of real-time transport protocol packets of MTSI services, a frame rate of MTSI services, a jitter duration of MTSI services, a sync loss duration of MTSI services, a round-trip time of MTSI services, an average codec bitrate of MTSI services, a call setup time for MTSI services, a comparable quality viewport switching latency of VR services, a list of viewports that have been rendered during the media presentation of VR services, and/or the like.

The base station 1712 may send the QoE measurement configuration parameters and/or information to the wireless device 1716. The QoE measurement configuration parameters and/or information may be sent via an RRC message 1732. The QoE measurement configuration parameters and/or information may be received by an access stratum (AS) layer 1718 of the wireless device 1716. The AS layer of the wireless device 1716 may send the QoE measurement configuration parameters and/or information (e.g., QoE measurement configuration 1736) to an application layer 1720 of the wireless device 1716. Configuration and reporting for multiple simultaneous QoE measurements for a wireless device 1716 may be supported.

The wireless device 1716 may perform one or more measurements based on the QoE measurement configuration 1736. For example, wireless device 1716 may determine QoE metric(s) comprising/indicating one or more of: an average throughput, initial playout delay, buffer level status, a list of playback periods (play list) for streaming and VR services, etc. The wireless device 1716 may determine QoE metric(s) comprising/indicating one or more of: successive loss of real-time transport protocol packets, frame rate, jitter duration, sync loss duration, round-trip time, average codec bitrate, call setup time for MTSI service, etc. For VR services, wireless device 1716 may determine QoE metric(s) comprising/indicating one or more of: comparable quality viewport switching latency, a list of viewports that have been rendered during the media presentation, etc. One or more results of the measurements may be used to generate a QoE report 1740.

The wireless device application layer 1720 may send the QoE report 1740 to the wireless device AS layer 1718. The wireless device AS layer 1718 may send the QoE report 1740 to the base station 1712. The QoE report 1740 may be sent in an RRC message 1744. The QoE report 1740 may be sent via a separate signaling radio bearer (SRB) (e.g., in NR). The base station 1712 may send/transmit the QoE report 1740 to the configured destination (e.g., an MCE 1748). RRC segmentation may be used for transmission of QoE reports. Management-based QoE configuration should not override signaling-based QoE configuration.

Deactivation of the QoE measurements, in signaling-based deactivation, may be configured by the OAM 1704 and triggered by the CN 1704. The OAM 1704 may send a message 1750, to the CN 1708, to configure QoE deactivation. The CN 1708 may initiate the deactivation of QoE measurement, as configured by OAM 1704, for example, based on receiving the message 1750. The CN 1708 may send a deactivation indication 1752 to the base station 1712 (e.g., NG-RAN node, eNB, a gNB, ng-eNB), for example, based on initiating the deactivation of QoE measurement. The deactivation indication 1752 may indicate which QoE measurement may be deactivated. The base station 1712 may send an RRC message 1756 (e.g., comprising the deactivation indication) to the wireless device AS layer 1718. The wireless device AS layer 1718 may send a deactivation message 1760 (e.g., comprising the deactivation indication) to the wireless device application layer 1720. The wireless device 1716 may deactivate the QoE measurements based on receiving the deactivation indication.

Figure 18:
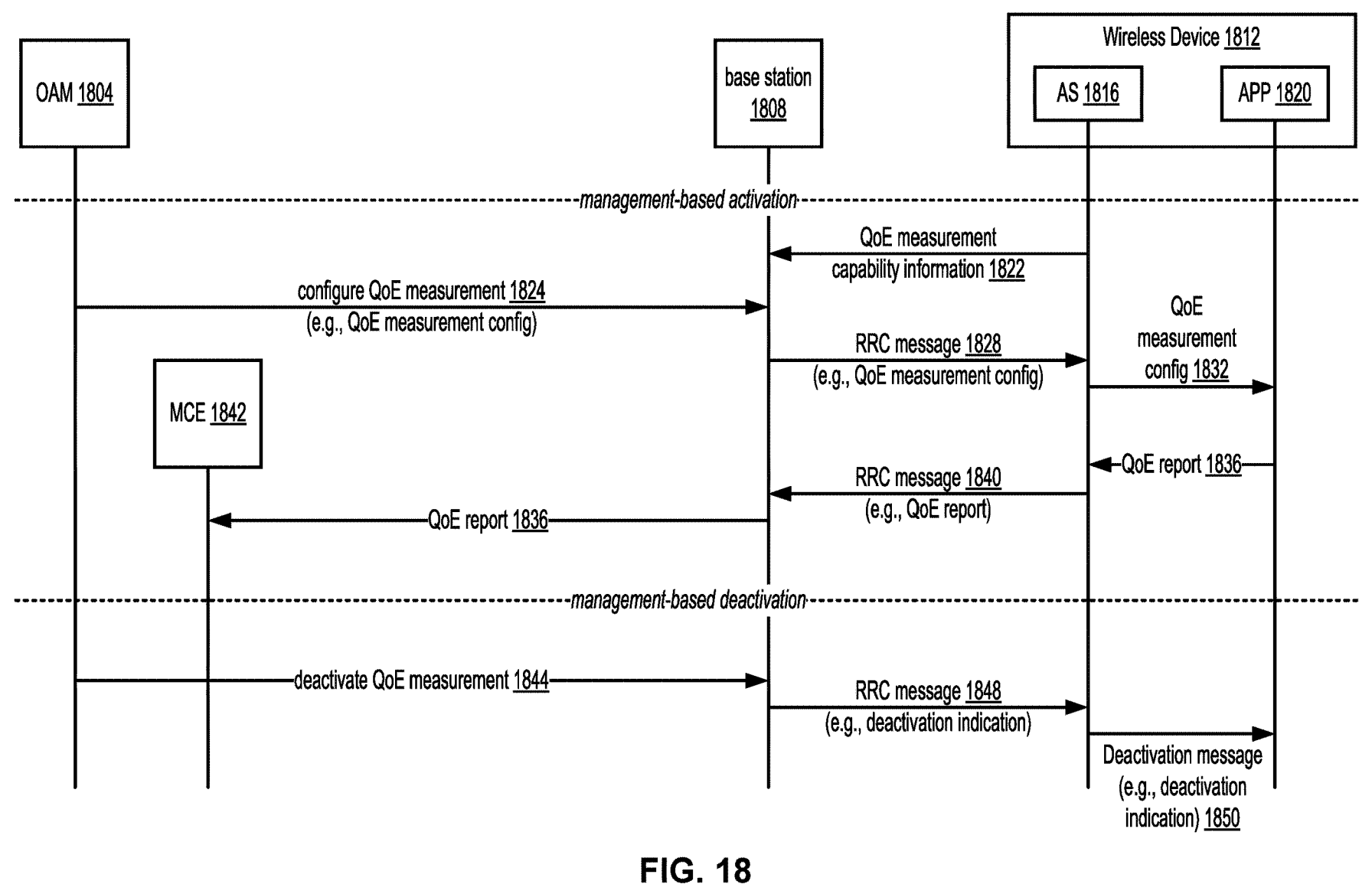

FIG. 18 shows an example of management-based activation and deactivation of measurement reporting. QoE measurement configuration parameters and/or information, in a management-based activation procedure, may be used for activating the QoE measurement QoE measurement, in a management-based activation procedure, may be triggered by an OAM 1704. The wireless device 1816 may send QoE measurement capability information 1822 to a base station 1808 (e.g., NG-RAN, gNB, eNB, etc.). The base station 1808 may send the received QoE measurement capability information 1822 to the OAM 1804.

The OAM may send a message 1824 comprising QoE measurement configuration parameters and/or information to a base station 1808 (e.g., an NG-RAN node). The OAM may send the message 1824, for example, based on receiving the QoE measurement capability information 1822. The QoE measurement configuration parameters/information may comprise one or more parameters/information as described with respect to FIG. 17. The base station 1808 may find/determine multiple qualified wireless devices that meet certain criteria. For example, the base station 1808 may determine/select the wireless device(s) that meet a required QoE measurement capability, area scope and slice scope, etc. The base station 1808 may send the QoE measurement configuration parameters and/or information to the AS layer 1816 of the wireless device 1816 and/or each qualified wireless device. The AS layer 1816 may send the QoE measurement configuration parameters and/or information (e.g., QoE measurement configuration 1832) to an application layer 1820 of the wireless device 1812. The application layer 1820 (e.g., when a session starts) may check the criteria (e.g. cell list, service type, etc.). The wireless device 1812 (e.g., the application layer 1820) may start QoE measurement and reporting, for example, if the criteria are met.

Measurement and reporting, for management-based activation, may be similar to the signaling-based activation described with respect to FIG. 16. One or more results of the measurements may be used to generate a QoE report (e.g., a QoE report 1836). The application layer 1820 may send the QoE report 1836 to the AS layer 1816. The AS layer 1816 may send the QoE report 1836 to the base station 1808. The QoE report 1836 may be sent in an RRC message 1840 to the base station 1808. The QoE report 1836 may be sent via a separate signaling radio bearer (SRB) (e.g., in NR). The base station 1808 may send/transmit the QoE report 1836 to the configured destination (e.g., an MCE 1842).

Deactivation of QoE measurements, in management-based deactivation, may be configured and triggered by the OAM 1804. The OAM 1804 may send a deactivation configuration 1844 to the base station 1808. The deactivation configuration 1844 may indicate which QoE measurement(s) should be deactivated. The base station 1808 may send a deactivation indication (e.g., in an RRC message 1848) to the AS layer 1816, for example, based on receiving the deactivation configuration 1844, The AS layer 1816 may send a deactivation indication to the application layer 1820, based on receiving the deactivation indication from the base station 1808.

QoE measurement triggering and deactivation may be realized using time-based and/or threshold-based criteria. The criteria configured by an OAM. Threshold-based QoE measurement triggering and deactivation enables QoE measurement to start and/or stop based on one or more thresholds being met.

A base station may issue a release of QoE measurement configuration for wireless device(s) that were previously configured for QoE measurement reporting. A base station may issue the release of QoE measurement configuration for the wireless device(s), for example, if a session (e.g., for which the QoE measurements are reported) is completed. A network (e.g., RAN) may release an ongoing QoE measurement configuration or QoE reporting configuration for the wireless device(s), for example, if the wireless device(s) are being handed over to a network that does not support QoE measurement and/or reporting.

A network/computing device may perform one or more actions, for example, based on overload in standalone connectivity. The one or more actions may comprise: stopping new QoE measurement configurations, releasing existing QoE measurement configurations, and/or pausing QoE measurement reporting. Configuration (e.g., RRC) signaling may be used by a base station to indicate, to the wireless device, pausing or resuming of the QoE reporting.

Seamless mobility may be a key functionality in wireless communications and its impacts may be measurable at the application layer. QoE measurement reporting continuity in intra-system, intra-RAT intra-node, and inter-node mobility scenarios may be supported, for example, to enable measuring the impact of mobility on an application and users' QoEManagement-based QoE measurement and signaling-based QoE measurement/reporting may be supported for intra-node mobility. At least signaling-based QoE measurement/reporting may be supported for inter-node mobility.

The QoE configuration may be forwarded from a source base station to a target base station (e.g., for mobility in LTE networks, other 4G/5G/6G networks, any other 3GPP network, etc.). The QoE configuration may be sent via a trace activation information element (IE) (e.g., via an X2 interface). The QoE configuration may be sent via the S1 interfaces for mobility scenarios, for example, if an X2 interface is not established between the source base station and the target base station. QoE measurement configuration transfer, for QoE measurements in an RRC connected state, may be supported via Xn and NG interfaces (e.g., for mobility in NR networks, other 4G/5G/6G networks, any other 3GPP network, etc.). The QoE configuration may be sent via a trace activation IE as a part of wireless device application layer measurement configuration IE. The application layer measurement configuration IE may comprise multiple QoE configurations for multiple service types. QoE measurements in RRC idle state and RRC inactive state may be supported (e.g., for MBS, or for any other service). QoE measurement configuration for a wireless device may be fetched from the node hosting the wireless device context, for example, to support mobility for QoE measurement configuration in an RRC inactive state.

Requirements for QoE measurements may stipulate that the client may check the QoE configuration when a session starts. The client may continue the QoE measurements for an ongoing session, for example, even if the UE moves out of a configured area. The requirements may be RAT independent. For example, the requirements may be applied to mobility solutions for QoE measurement for any wireless communication technology (e.g., 5G technology, 3GPP Release 16, earlier/later 3GPP releases or generations, NR technology, LTE technology, 6G technology, and/or any other technology). QoE measurement reporting continuity in intra-system, inter-RAT mobility scenarios may be supported. QoE measurement reporting continuity in inter-system mobility scenarios may be supported.

An access network (e.g., a RAN, base station) may be unable to determine/use QoE metrics (e.g., as described with respect to FIGS. 17 and 18) in some scenarios. The access network may be unable to determine/use the QoE metrics as the QoE metrics may be assembled by the OAM, sent via containers, and intended to be processed by an MCE associated with a network. QoE information (e.g., QoE report, metrics) may need to be visible by the base station, for example, in order for the base station to use the QoE information. Access network-visible (e.g., RAN-visible) QoE information may be simplified QoE information as abstracted from QoE metrics by a wireless device. The RAN-visible QoE information may be used by a base station for various types of enhancement. The RAN-visible QoE information may be used for one or more services. The access network (e.g., RAN) may be responsible for assembling a RAN-visible QoE measurement configuration. The RAN may be responsible for triggering (e.g., activating) the RAN-visible QoE measurement. The RAN may be able to configure RAN-visible QoE information autonomously for a given service type, for example if an application layer QoE measurement for the same service type is already configured. A RAN-visible QoE value can be generated by a wireless device and/or a QoE server. The RAN may need to read/process a QoE report in XML format such that the RAN may generate RAN-visible QoE values.

Figure 19:
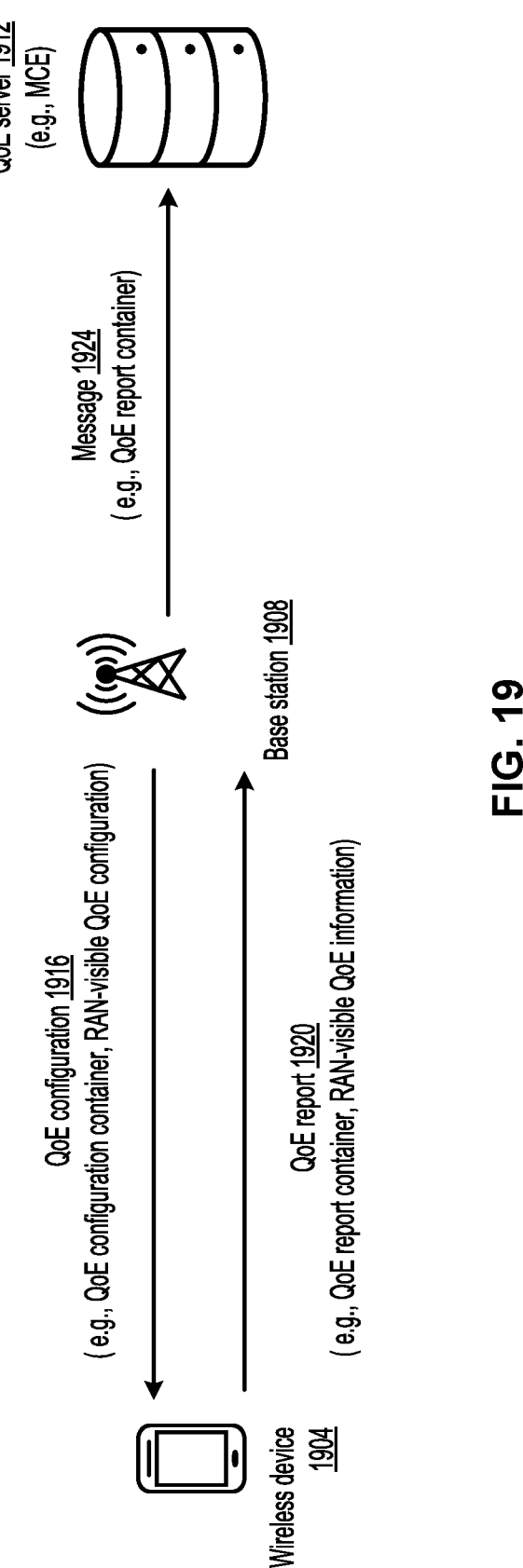
FIG. 19 shown example quality of experience (QoE) information reporting.

FIG. 19 shows example QoE information reporting. The QoE information reporting may comprise RAN-visible QoE information reporting. A base station 1908 (e.g., an NG-RAN node, eNB, a gNB, ng-eNB) may assemble and send QoE configuration 1916 (e.g., RAN-visible QoE configuration) to a wireless device 1904. The RAN-visible QoE configuration may be sent along with a QoE measurement configuration container sent/transmitted from an OAM (e.g., directly or via a CN). The QoE configuration 1916 may be sent via an RRC message.

The wireless device 1904 may receive and process/apply the RAN-visible QoE configuration and/or the QoE measurement configuration container. The RAN-visible QoE configuration may be such that a corresponding reported RAN-visible QoE information/report may be a unique value or a combination of values. The RAN-visible QoE report may reflect the QoE metrics as may be useful for RAN (e.g. buffer level). The RAN-visible QoE report may be provided, from the application layer of the wireless device 1904, to the RRC layer of the wireless device 1904 via an AT command. The RRC layer of the wireless device 1904 may include the RAN-visible QoE report along with a QoE report container for transmission to the base station 1908. The RAN-visible QoE report may be included as a separate IE (e.g., in the MeasReportAppLayer IE) The wireless device 1904 may send a QoE report 1920 (e.g., comprising the RAN-visible QoE report and/or the QoE report container) to the RAN (e.g., the base station 1908). The QoE report 1920 may be sent, by the wireless device 1904, via an RRC message. The base station 1908 may read/process the RAN-visible QoE information and/or may forward the QoE report container (e.g., via a message 1924) to a QoE server 1912 (e.g., an MCE). The base station 1908 may read/process the RAN-visible QoE information and/or may forward the QoE report container to a QoE server 1912 (e.g., an MCE). Additionally, or alternatively, an OAM server may generate the RAN-visible QoE report and may send it to the RAN (e.g., the base station 1908).

A RAN may trigger radio-related measurements by a wireless device such that the network may further evaluate and improve the QoE. The RAN may trigger radio-related measurements based on the QoE measurement configuration parameters and/or information received from the OAM. Collection of radio-related measurements may be done using minimization of drive-tests (MDT), or any other measurement/collection method. The radio-related QoE measurements may be reported for all types of supported services. The radio-related QoE measurements may include additional measurements related to the radio interface. Additional radio-related QoE measurements may be performed as a part of MDT measurements, for example, if new radio-related measurements, with respect to what is currently specified in MDT, are required for QoE management. Application-related QoE measurements may be collected, for example, when the application session is ongoing. It may be efficient for radio-related measurements and reporting to start simultaneously (or substantially simultaneously), for example, if the radio-related measurements are used for assisting application-related QoE measurements. Correlation of results of the radio-related measurements and application-related QoE measurements may be done by post processing, for example, if the radio-related measurements and application-related QoE measurements are configured together (e.g. using same trace reference and time aligned, based on time stamps). Radio-related information may also be reported (e.g., in addition to radio-related measurement results). Radio-related information may be reported, for example, even if radio-related measurements are not triggered over the radio. Both radio-related measurement results and radio-related information may be aligned and correlated with the QoE report.

Figure 20:
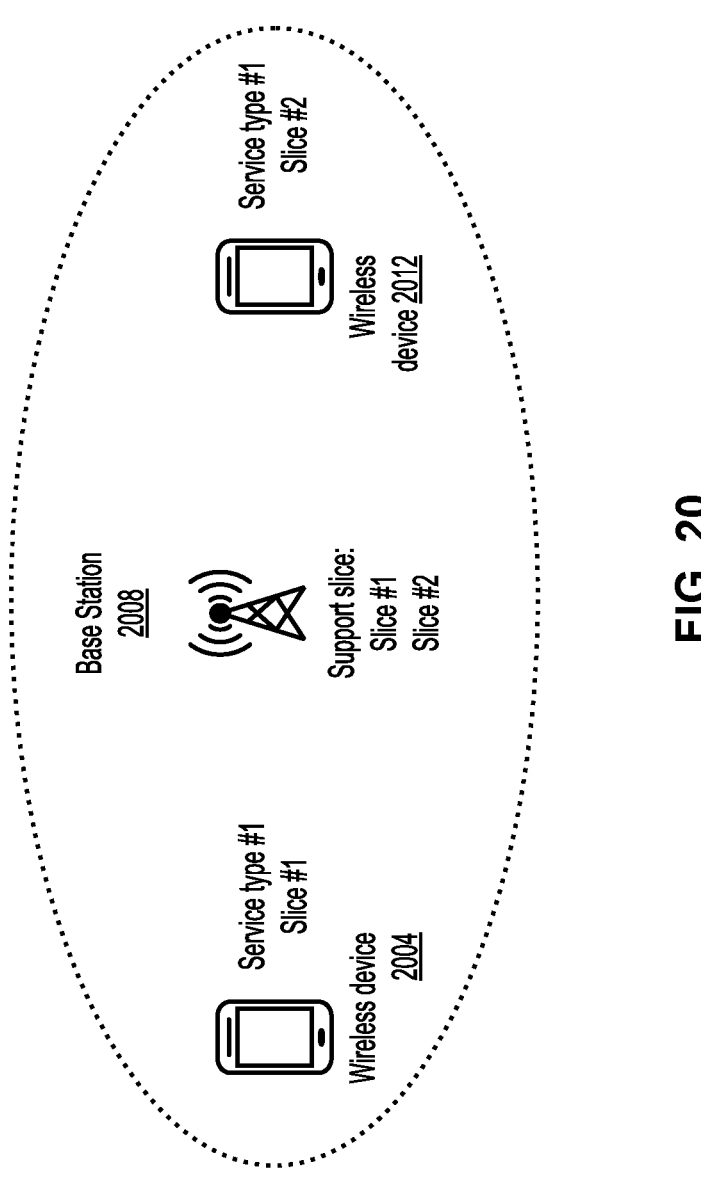
FIG. 20 shows an example of network slices for serving wireless devices.

FIG. 20 shows an example of network slices for serving wireless devices. The slices may serve a plurality of wireless devices (e.g., wireless devices 2004, 2012). Each wireless device may be associated with a same service type but may be served by different slices. For example, the wireless device 2004 may be served by slice #1 and the wireless device 2012 may be served by slice #2. QoE of the wireless devices 2008, 2012 may be different for the same service type, for example, if the service level agreement (SLA) of slice #1 and slice #2 are different.

Three scenarios may be considered for per slice QoE measurement. In a first scenario, different service types may use different slices. In a second scenario 2, different service types may use the same slice. In a third scenario 3, the same service type may use different slices.

An OAM and/or CN (or any other device/function associated with the network) may send/transmit, to a base station, the QoE measurement configuration parameters and/or information (e.g., QoE measurement configuration). The QoE measurement configuration may comprise/indicate a slice scope (e.g., a list of S-NSSAIs). The base station may map the slice scope to an ongoing PDU session list. The base station may send, to the wireless device, the QoE measurement configuration and the PDU session list. The wireless device may receive the QoE measurement configuration. The wireless device may send the QoE measurement configuration to the application layer corresponding to the PDU session list. The wireless device may send, to the base station, a QoE report along with a (e.g., corresponding) PDU session indicator/identifier (ID). The base station may remap the PDU session ID back to slice indicator/ID (e.g., S-NS-SAI) and attach it in the QoE report. The base station may forward the QoE report, comprising the slice indicator/ID, to the MCE.

The OAM and/or the CN (or any other device/function associated with the network) may send/transmit, to the base station, the QoE measurement configuration parameters and/or information (e.g., QoE measurement configuration). The QoE measurement configuration may comprise/indicate the slice scope. The base station may check/compare the slice scope with the ongoing PDU session(s). The base station may send the QoE measurement configuration to a wireless device with a qualified PDU session (e.g., including the slice scope), for example, based on checking/comparing the slice scope with the ongoing PDU session(s). The wireless device may receive the QoE measurement configuration and may send it to the application layer corresponding to the slice scope. The wireless device may remap the PDU session(s) back to the slice indicator/ID and attach it in the QoE report. The mapping may be performed in application layer or in the AS layer. The wireless device may send the QoE report (e.g., with the slice ID) to the base station. The base station may forward the QoE report, comprising the slice ID, to the MCE.

The OAM and/or the CN or any other device/function associated with the network) may send/transmit, to the base station, the QoE measurement configuration parameters and/or information (e.g., QoE measurement configuration). The QoE measurement configuration may comprise/indicate the associated slice ID (e.g., outside the QoE configuration container, and visible to the RAN). The base station node may check/compare the slice ID against the ongoing PDU session(s). The base station may send the QoE measurement configuration to a wireless device with a qualified PDU session (e.g., including the slice ID), for example, based on checking/comparing the slice scope with the ongoing PDU session(s). The wireless device may receive the QoE measurement configuration and may perform QoE measurements. The wireless device may send the QoE report to the base station. The wireless device may include, in the QoE report, the slice ID (e.g., outside the QoE report container). The base station may forward the QoE report, comprising the slice ID, to the MCE.

Figure 21A:
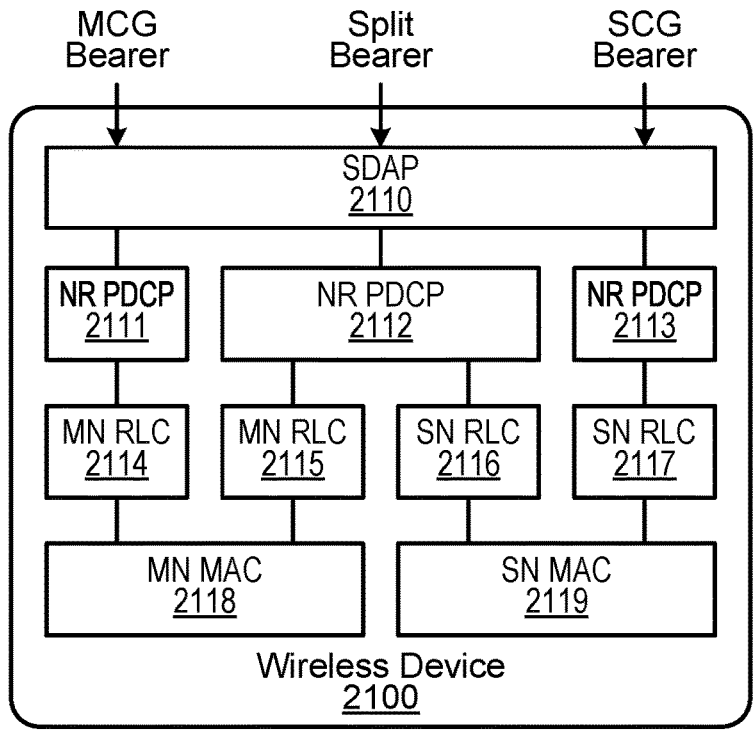
FIG. 21A and FIG. 21B show packet flows using multi connectivity.
Figure 21B:
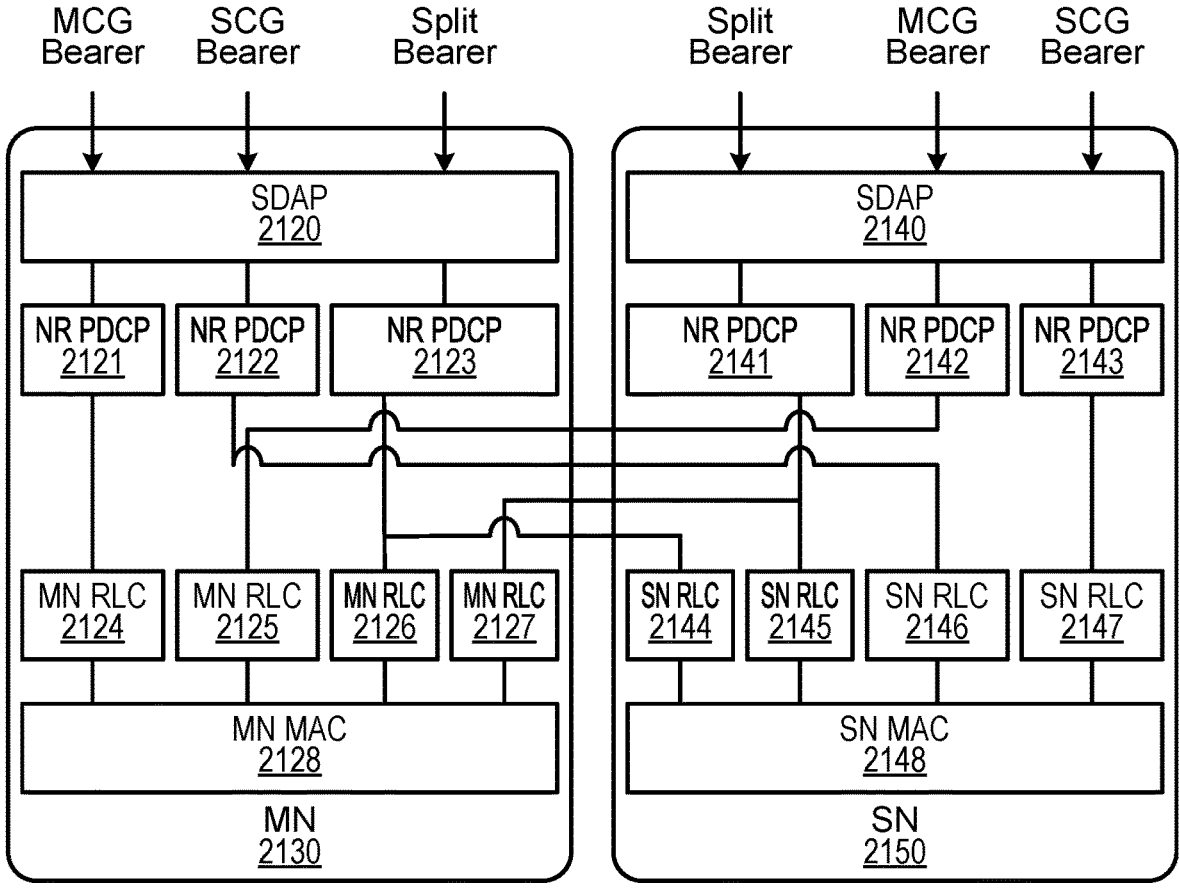

FIG. 21A and FIG. 21B show packet flows using multi connectivity (e.g., dual connectivity, multi connectivity, tight interworking, and/or the like). FIG. 21A shows an example of a protocol structure of a wireless device 2100 (e.g., UE) with CA and/or multi connectivity. FIG. 21B shows an example of a protocol structure of multiple base stations with CA and/or multi connectivity. The multiple base stations may comprise a master node, MN 2130 (e.g., a master node, a master base station, a master gNB, a master eNB, and/or the like) and a secondary node, SN 2150 (e.g., a secondary node, a secondary base station, a secondary gNB, a secondary eNB, and/or the like). A master node 2130 and a secondary node 2150 may co-work to communicate with a wireless device 2100.

If multi connectivity is configured for a wireless device 2100, the wireless device 2100, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 2130) may provide a master cell group (MCG) comprising a primary cell and/or one or more secondary cells for a wireless device (e.g., the wireless device 2100). A secondary base station (e.g., the SN 2150) may provide a secondary cell group (SCG) comprising a primary secondary cell (PSCell) and/or one or more secondary cells for a wireless device (e.g., the wireless device 2100).

In wireless communications (e.g., in multi connectivity), a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 2100) may send (e.g., transmit) and/or receive: packets of an MCG bearer via an SDAP layer (e.g., SDAP 2110), a PDCP layer (e.g., NR PDCP 2111), an RLC layer (e.g., MN RLC 2114), and a MAC layer (e.g., MN MAC 2118); packets of a split bearer via an SDAP layer (e.g., SDAP 2110), a PDCP layer (e.g., NR PDCP 2112), one of a master or secondary RLC layer (e.g., MN RLC 2115, SN RLC 2116), and one of a master or secondary MAC layer (e.g., MN MAC 2118, SN MAC 2119); and/or packets of an SCG bearer via an SDAP layer (e.g., SDAP 2110), a PDCP layer (e.g., NR PDCP 2113), an RLC layer (e.g., SN RLC 2117), and a MAC layer (e.g., MN MAC 2119).

A master base station (e.g., MN 2130) and/or a secondary base station (e.g., SN 2150) may send (e.g., transmit) and/or receive: packets of an MCG bearer via a master or secondary node SDAP layer (e.g., SDAP 2120, SDAP 2140), a master or secondary node PDCP layer (e.g., NR PDCP 2121, NR PDCP 2142), a master node RLC layer (e.g., MN RLC 2124, MN RLC 2125), and a master node MAC layer (e.g., MN MAC 2128); packets of an SCG bearer via a master or secondary node SDAP layer (e.g., SDAP 2120, SDAP 2140), a master or secondary node PDCP layer (e.g., NR PDCP 2122, NR PDCP 2143), a secondary node RLC layer (e.g., SN RLC 2146, SN RLC 2147), and a secondary node MAC layer (e.g., SN MAC 2148); packets of a split bearer via a master or secondary node SDAP layer (e.g., SDAP 2120, SDAP 2140), a master or secondary node PDCP layer (e.g., NR PDCP 2123, NR PDCP 2141), a master or secondary node RLC layer (e.g., MN RLC 2126, SN RLC 2144, SN RLC 2145, MN RLC 2127), and a master or secondary node MAC layer (e.g., MN MAC 2128, SN MAC 2148).

In multi connectivity, a wireless device may configure multiple MAC entities, such as one MAC entity (e.g., MN MAC 2118) for a master base station, and other MAC entities (e.g., SN MAC 2119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a quantity/number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) transmitted via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

QoE measurements/metrics may enable networks to measure user experience (e.g., at application layer level). Networks and/or service providers may use the data collected by the MCE to improve network performance and user experience. For example, a choppy video stream may be reflected by poor QoE metrics, which may be subsequently reported to an MCE. The network may perform one or more actions to improve user experience based on receiving the QoE metrics A base station may serve/communicate with a large quantity of wireless devices. The wireless devices may receive audio, video streaming services, MTSI services, and/or any other services. The wireless devices may perform QoE measurement and/or reporting associated with one or more services. QoE measurement and reporting may be performed by a wireless device for each service associated with the wireless device. In scenarios with heavy network traffic, a base station may suffer from radio signaling overload (e.g., signaling overload caused by excessive RRC signaling, etc.).

Figure 22:
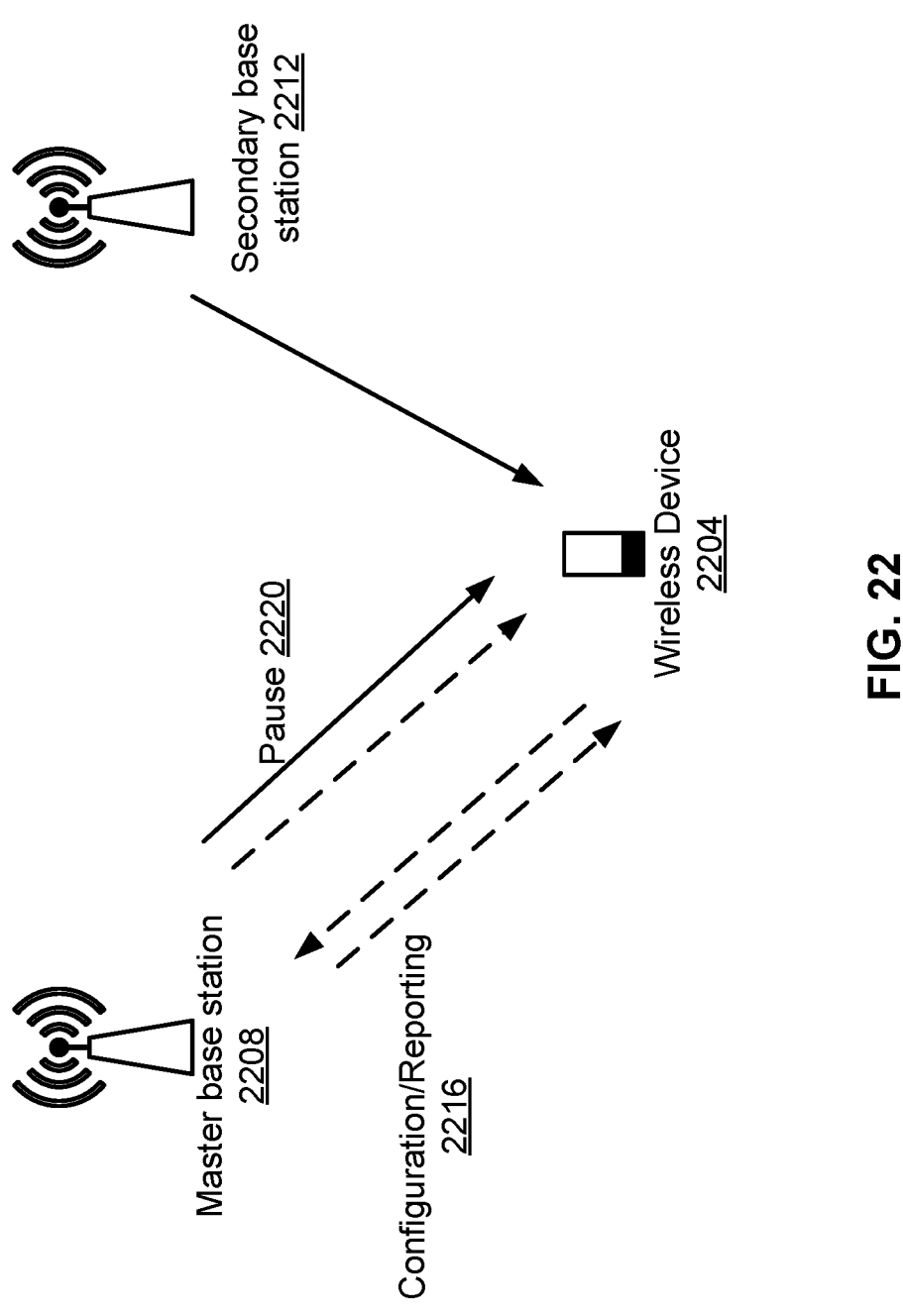
FIG. 22 shows example QoE measurement and reporting.

FIG. 22 shows example QoE measurement and reporting. A wireless device 2204 may communicate with a master base station 2208 and a secondary base station 2212. The master base station 2208 may configure, and the wireless device 2204 may report, QoE measurements 2216. The master base station 2208 may pause 2220 the on-going QoE measurement/reporting (e.g., from the wireless device 2204) to relieve signaling overload in the network. Pausing QoE measurement/reporting may decrease efficiency of MCE for QoE collection and evaluation. Networks and/or service providers may not be able to improve network performance and user experience because of non-availability of QoE measurements.

The master base station 2208 may perform radio signaling for QoE measurement report and, additionally, may perform other radio signaling (e.g., RRC setup, RRC reconfiguration, RRC reestablishment, RRC resume, paging, etc.) for a wireless device. The other radio signaling may have higher priority than the radio signaling for QoE measurement reporting. The master base station 2208 may pause the QoE measurement and reporting for the wireless device, if necessary. The master base station 2208 may pause the QoE measurement and reporting for the wireless device, for example, to ensure that other, higher-priority signaling may be transmitted. Pausing QoE measurement/reporting, for other signaling, may decrease the efficiency of MCE for QoE collection and evaluation. Networks and/or service providers may not be able to improve network performance and user experience because of non-availability, or delay in availability, of QoE measurements.

A first base station (e.g., a master base station) may provide one or more services to a wireless device. The one or more services may be associated with QoE measurement reporting. The service(s) may be provided using dual connectivity, for example, via the first base station (e.g., the master base station) and/or a second base station (e.g., a secondary base station). Radio signaling, associated with the QoE measurement reporting, may overload the master base station. The first base station may determine to offload radio signaling associated with QoE measurement reporting to the second base station. The first base station may determine to offload the radio signaling associated with QoE measurement reporting to the second base station of the wireless device, for example, based on signaling overload at the first base station, based on anticipated signaling overload at the first base station, as a default action, and/or based on any other reason/trigger. The first base station may indicate, to the second base station, to configure a QoE measurement report. The first base station may send, to the wireless device, a configuration of a QoE measurement report. QoE measurements associated with the first base station may be reported via the second base station, for example, based on the configuring the QoE measurement report. For example, the QoE measurements associated with the first base station may be reported to the second base station, and the second base station may transfer the QoE measurements to the first base station. Signaling to (e.g., direct signaling to) the first base station may be reduced because of reporting of QoE measurements via the second base station. Reporting of QoE measurements via the second base station may provide various advantages such as potentially reducing and/or avoiding signaling overload at the first base station.

The first base station may indicate, to the second base station, to configure the QoE measurement report via an SRB (e.g., a particular SRB and/or type of SRB). The indicated SRB may be an SRB of the second base station. For example, the SRB may be SRB3, SRB4, SRB5, and/or any other SRB of the second base station. QoE measurements associated with the first base station may be reported, by the wireless device, via the SRB of the second base station. Reporting of QoE measurements via SRBs of the second base station may reduce signaling via SRBs associated with the first base station (e.g., via SRB1 and/or SRB2) (e.g., potentially reducing and/or avoiding overload of the first base station). QoE collection and evaluation associated with a service that is (e.g., at least in part) provided by a first base station may be performed via a second base station. The potential of overload at the first base station pausing of the QoE measurement reporting is reduced.

The first base station (e.g., a master base station) may determine to offload the QoE measurement report to the second base station (e.g., a secondary base station) of a wireless device. The first base station may determine to offload the QoE measurement report to the second base station of a wireless device, for example, if the first station determines to offload data packet transmission/reception (e.g., PDU sessions, data radio bearers, data flows, etc.) to the second base station of the wireless device. Radio signaling at the first base station may or may not be overloaded. Offloading QoE measurements to the second base station may provide various advantages such as increased availability of resources and reduced probability of signaling overload at the first base station.

Figure 23:
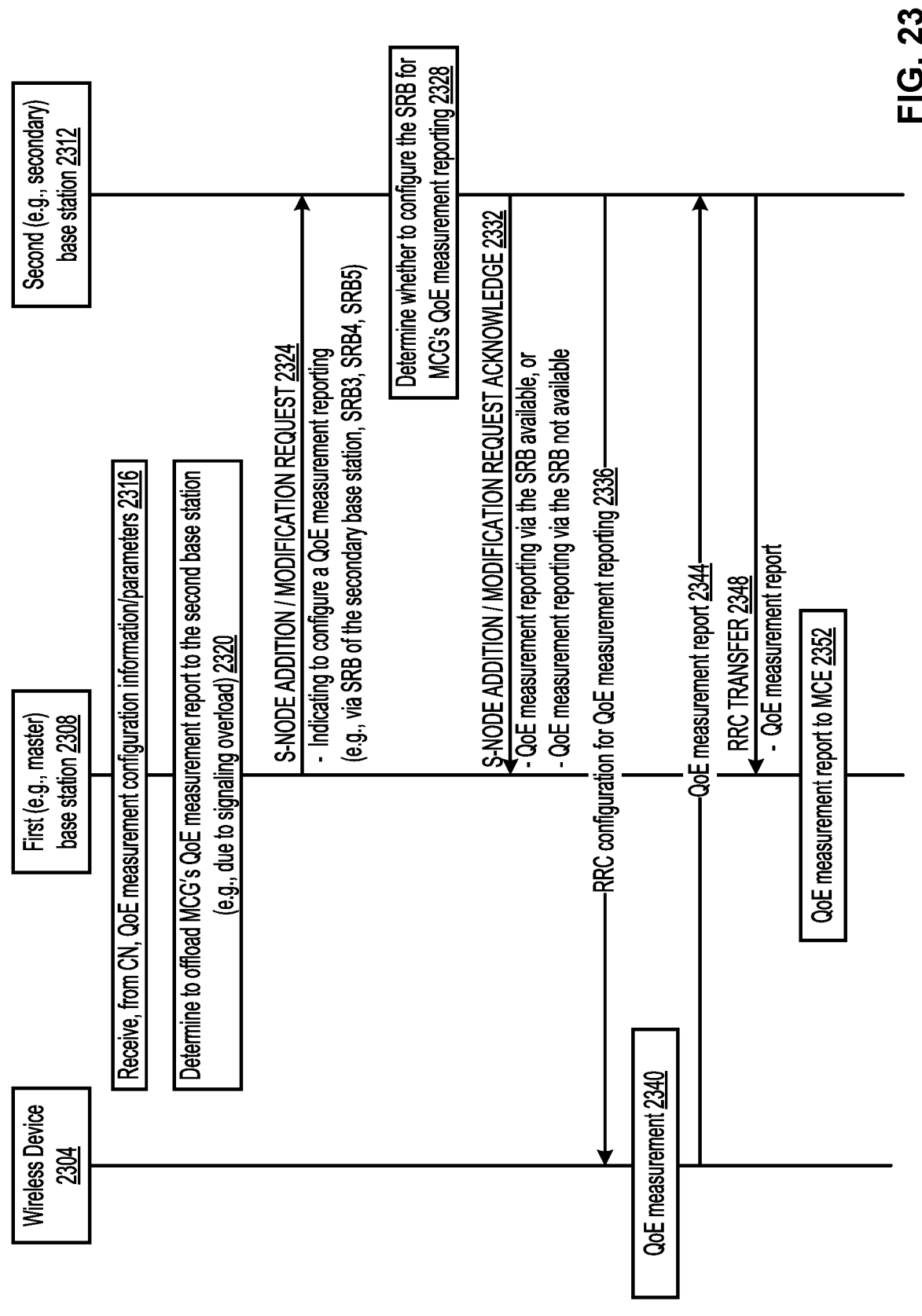
FIG. 23 show example QoE measurement.

FIG. 23 shows example QoE measurement. A first base station 2308 (e.g., a master base station) may offload at least some QoE reporting processes to a second base station 2312 (e.g., a secondary base station). For example, the first base station 2308 may send a request, to the second base station 2312, to configure QoE reporting for a wireless device 2304. The second base station 2312 may receive a QoE measurement report, from the wireless device 2304, and send the QoE measurement report to the first base station 2308 (e.g., via a backhaul, wired interface, Xn interface, X2 interface, etc.). Use of a wired interface or a backhaul for transmission of the QoE measurement report may avoid overloading wireless resources associated with the first base station.

The first base station 2308 (e.g., a master base station) may receive (e.g., step 2316), from a CN node (e.g., AMF, SMF, MME, etc.), QoE measurement configuration parameters and/or information. The QoE measurement configuration parameters and/or information may be associated with the wireless device 2304. The first base station 2308 may receive QoE measurement configuration parameters and/or information for the first base station 2308 and/or for the second base station 2312. The QoE measurement configuration parameters and/or information may be the same or different for the first base station 2308 and the second base station 2312. The QoE measurement configuration parameters and/or information for the second base station 2312 may be for a secondary base station (e.g., in a dual connectivity scenario). For example, the first base station and the second base station may be a master base station and a secondary base station, respectively, in a dual connectivity scenario. The QoE measurement configuration parameters and/or information may be received in/via one or more messages. The one or more messages and/or QoE measurement configuration parameters and/or information may comprise at least one of: an indicator/identifier (e.g., MME UE S1AP ID) of the wireless device 2304 within/assigned by an MME, an indicator/identifier (e.g., AMF UE NGAP ID) of the wireless device 2304 within/assigned by the AMF, an identifier (e.g., eNB UE S1AP ID) of the wireless device 2304 as assigned by the first base station 2308, an identifier (e.g., RAN UE NGAP ID) of the wireless device within/ assigned by a radio access network (e.g., an NG-RAN, or the first base station 2308), and/or the like.

The first base station 2308 may determine (e.g., step 2320) to offload QoE measurement reporting to the second base station 2312. The QoE measurement reporting may be associated with the wireless device 2304. The QoE measurement reporting may be associated with a cell group (e.g., an MCG) of the first base station. The determination to offload may be made for any suitable reason. For example, the first base station 2308 may suffer from radio signaling overload (e.g., RRC signaling overload, etc.). The first base station 2308 may suffer from radio signaling overload if a large quantity of wireless devices, as connected to/associated with the first base station 2308, perform high bandwidth and/or overhead communications (e.g., receiving video streaming services, MTSI services, etc.), for which QoE measurement and reporting may be performed by the involved wireless devices. QoE measurement and reporting may be performed, for each service associated with a wireless device, causing consumption of signaling resources. The first base station 2308 may perform other radio signaling (e.g., RRC setup, RRC reconfiguration, RRC reestablishment, RRC resume, paging, etc.) for the associated wireless devices. The other radio signaling may have higher priority, at the first base station 2308, than the radio signaling associated with QoE measurement reporting. The first base station 2308 may determine to offload (e.g., on-going) QoE measurement reporting to the second base station 2312 of the wireless device 2304, for example, based on radio signaling overload (e.g., because of QoE measurement reporting for a large quantity of devices) and/or based on performing other, higher priority, radio signaling. The first base station 2308 may determine to offload (e.g., on-going) QoE measurement reporting to the second base station 2312 of the wireless device 2304, for example, if the first base station 2308 determines to offload data packets (e.g., PDU sessions, data radio bearers, data flows, etc.) to the second base station 2312 of the wireless device 2304.

The first base station 2308 may send to the second base station 2312, an indication 2324 to configure a QoE measurement report/QoE measurement reporting for the wireless device 2304. The first base station 2308 may send the indication 2324 to the second base station 2312, for example, based on determining to offload QoE measurement reporting to the second base station 2312. The indication 2324 to configure the QoE measurement report may indicate a particular SRB or a type of SRB. For example, the indication 2324 to configure the QoE measurement report may indicate an SRB of the second base station 2312 (e.g., SRB3, SRB4, SRB5, and/or any other SRB of the second base station 2312). The SRB may be for transmission, by the wireless device 2304 to the second base station 2312, of QoE measurement reporting.

The determining to offload and/or sending of the indication 2324 to configure QoE measurement reporting may be performed after dual connectivity is set up, or before dual connectivity is set up. The first base station 2308 may set up dual connectivity to provide a service to the wireless device 2304. The first base station 2308 and second base station 2312 may provide the service to the wireless device 2304. The service may be associated with QoE measurement reporting. The first base station 2308 may determine that signaling resources are scarce, and determine to offload QoE measurement reporting to the second base station 2312. The first base station 2308 may determine to set up dual connectivity to provide a service to the wireless device, and may set up the dual connectivity such that QoE measurement reporting is by the second base station 2312.

The indication 2324 to configure QoE measurement reporting may be sent, to the second base station 2312, in a message comprising at least one of: an X2 interface message for a dual connectivity of the wireless device 2304, an Xn interface message for a dual connectivity of the wireless device 2304, a secondary node addition request message for a dual connectivity of the wireless device 2304, a secondary node modification request message for the dual connectivity of the wireless device 2304, and/or the like. The indication 2324 to configure QoE measurement reporting may be sent, to the second base station 2312, in a message comprising at least one of: an indicator/identifier (e.g., MeNB UE X2AP ID, SgNB UE X2AP ID) of the wireless device 2304 as assigned by a base station (e.g., eNB, gNB, the first base station 2308, the second base station 2312); an identifier (e.g., M-NG-RAN node UE XnAP ID, S-NG-RAN node UE XnAP ID) of the wireless device as assigned by a master access network (e.g., NG-RAN, the first base station 2308) node or a secondary access network (e.g., NG-RAN, the second base station 2312) node, and/or the like. The QoE measurement report may be for/associated with the MCG of the wireless device.

The indication 2324 to configure QoE measurement reporting may be sent to the second base station 2312 in a message. The message may comprise QoE measurement configuration parameters and/or information. The QoE measurement configuration parameters and/or information may be QoE measurement configuration parameters and/or information which was received, by the first base station 2308, from the CN node. The QoE measurement configuration parameters and/or information may be for the second base station 2312 (e.g., for a secondary base station in a dual connectivity scenario).

The indication 2324 to configure the QoE measurement report may indicate a particular resource (e.g., SRB) or a type of resource (e.g., a type of SRB) for QoE measurement reporting. The type of the SRB may comprise at least one of: an SRB3, an SRB4, an SRB5 (e.g., combination of SRB3 and SRB4), and/or the like. SRB3 may be for messages (e.g., RRC messages), for example, if the wireless device 2304 is in one or more scenarios/configurations (e.g., E-UTRA NR Dual Connectivity (EN-DC), E-UTRA NR Dual Connectivity with E-UTRA connected to 5GC (NGEN-DC), or NR-NR dual connectivity (NR-DC) using DCCH logical channel, etc.). SRB4 may be for messages (e.g., RRC messages) which may comprise application layer measurement report information using DCCH logical channel. SRB4 may be configured by the network, for example, after AS security activation. SRB5 may be a combination of SRB3 and SRB4.

The SRB may be for communication of an RRC message via the second base station 2312 (e.g., the secondary base station) of the wireless device 2304. The RRC message may comprise at least one measurement report application layer message.

The measurement report application layer message may comprise at least one of: a measurement configuration application layer identifier, a measurement report application layer container, and/or the like. The measurement report application layer container may comprise application layer measurement results for at least one of: an average throughput of streaming services and/or VR services, an initial playout delay of streaming services and/or VR services, a buffer level status of streaming services and/or VR services, a list of playback periods (play list) of streaming services and/or VR services, a successive loss of real-time transport protocol packets of MTSI services, a frame rate of MTSI services, a jitter duration of MTSI services, a sync loss duration of MTSI services, a round-trip time of MTSI services, an average codec bitrate of MTSI services, a call setup time for MTSI service of MTSI services, a comparable quality viewport switching latency of VR services, a list of viewports that have been rendered during the media presentation of VR services, and/or the like. The measurement report application layer container may comprise application layer measurement results for any other type of services.

The second base station 2312 may determine (e.g., step 2328) to configure QoE measurement reporting of the wireless device 2304. The determining may be based on receiving, from the first base station 2308, of the indication 2324 to configure QoE measurement reporting. The indication 2324 to configure QoE measurement reporting may indicate an SRB or SRB type. The second base station 2312 may configure the QoE measurement reporting based on the indicated SRB or SRB type.

The second base station 2312 may send, to the first base station 2308, an indication 2332 of whether the QoE measurement reporting of the wireless device 2304 is available or not available, supported or not supported, etc. The second base station 2312 may indicate, via the indication 2332, whether the QoE measurement reporting, via the indicated SRB, is available or not available, supported or not supported, etc.

A cause value, in the indication 2332, may indicate a cause, for example, if the QoE measurement reporting (e.g., via the indicated SRB or SRB type) is not available, not supported, etc. The cause value may indicate at least one of: not supporting the SRB or SRB type, the SRB or SRB type being not available, the SRB or SRB type being temporarily not available, signaling overloaded at the second base station 2312, and/or the like.

The indication sent by the second base station 2312 to the first base station 2308 may comprise at least one of: an X2 interface message for a dual connectivity of the wireless device 2304, an Xn interface message for a dual connectivity of the wireless device 2304, a secondary node addition request acknowledge message for a dual connectivity of the wireless device 2304, a secondary node modification request acknowledge message for the dual connectivity of the wireless device 2304, and/or the like. The message may comprise at least one of: an indicator/identifier (e.g., MeNB UE X2AP ID, SgNB UE X2AP ID) of the wireless device 2304 as assigned by a base station (e.g., an eNB, a gNB, the first base station 2308, the second base station 2312); or an indicator/identifier (e.g., M-NG-RAN node UE XnAP ID, S-NG-RAN node UE XnAP ID) of the wireless device 2304 as assigned by a master access network (e.g., NG-RAN, the first base station 2308) node or a secondary access network (e.g., NG-RAN, the second base station 2312) node, and/or the like.

The second base station 2312 may determine QoE measurement reporting configuration parameters for the wireless device 2304. The QoE measurement reporting configuration parameters may be an RRC configuration for QoE measurement reporting. Determining the QoE measurement reporting configuration parameters may be based on the QoE measurement configuration parameters and/or information received from the first base station 2308.

The second base station 2312 may send, to the wireless device 2304, the QoE measurement configuration parameters and/or information (e.g., RRC configuration for QoE measurement reporting 2336). The QoE measurement configuration parameters and/or information may be sent to the wireless device 2304 via an SRB (e.g., the SRB or SRB type indicated by the first base station 2308). The SRB or SRB type may comprise at least one of: an SRB3, an SRB4, an SRB5 (e.g., combination of SRB3 and SRB4), and/or the like.

The QoE measurement configuration parameters and/or information may be received by an AS layer of the wireless device 2304 from the second base station 2312. The AS layer of the wireless device 2304 may send the QoE measurement configuration parameters to an application layer of the wireless device 2304.

The wireless device may perform (e.g., step 2340) one or more QoE measurements. The application layer of the wireless device 2304 may perform one or more measurements based on the received QoE measurement configuration parameters and/or information. For example, the application layer of the wireless device 2304 may determine QoE metrics comprising at least one of: an average throughput of streaming services and/or VR services, an initial playout delay of streaming services and/or VR services, a buffer level status of streaming services and/or VR services, a list of playback periods (e.g., a play list) of streaming services and/or VR services, a successive loss of real-time transport protocol packets of MTSI services, a frame rate of MTSI services, a jitter duration of MTSI services, a sync loss duration of MTSI services, a round-trip time of MTSI services, an average codec bitrate of MTSI services, a call setup time for MTSI service of MTSI services, a comparable quality viewport switching latency of VR services, a list of viewports that have been rendered during the media presentation of VR services, and/or the like. The application layer of the wireless device 2304 may determine QoE metrics associated with one or more other services.

The application layer of the wireless device 2304 may generate a QoE measurement report 2344 based on the QoE measurements. The QoE measurement report 2344 may be associated with the first base station 2308 (e.g., one or more cells of the first base station 2308, an MCG of the first base station 2308, a service provided at least in part by the first base station 2308, etc.), the second base station 2312 (e.g., one or more cells of the second base station 2308, an SCG of the second base station 2312, a service provided at least in part by the second base station 2312, etc.), or a combination thereof. The QoE measurement report 2344 may be for the MCG of the wireless device 2304. The application layer of the wireless device 2304 may send the QoE measurement report 2344 to the AS layer of the wireless device 2304. The AS layer of the wireless device 2304 may send the QoE measurement report 2344 to the second base station 2312. The QoE measurement report 2344 may be sent via the indicated SRB and/or SRB type. The SRB may be for communication of an RRC message via the second base station 2312 of the wireless device 2304. The RRC message may comprise at least one measurement report application layer message. The measurement report application layer message may comprise at least one of: a measurement configuration application layer indicator/identifier, a measurement report application layer container, and/or the like.

The measurement report application layer container may comprise/indicate application layer measurement results (e.g., QoE metrics) for at least one of: an average throughput of streaming services and/or VR services, an initial playout delay of streaming services and/or VR services, a buffer level status of streaming services and/or VR services, a list of playback periods (e.g., a play list) of streaming services and/or VR services, a successive loss of real-time transport protocol packets of MTSI services, a frame rate of MTSI services, a jitter duration of MTSI services, a sync loss duration of MTSI services, a round-trip time of MTSI services, an average codec bitrate of MTSI services, a call setup time for MTSI service of MTSI services, a comparable quality viewport switching latency of VR services, a list of viewports that have been rendered during the media presentation of VR services, and/or the like. The measurement report application layer container may comprise/indicate application layer measurement results associated with one or more other services.

The second base station 2312 of the wireless device 2304 may send/transmit, to the first base station and after receiving the QoE measurement report 2344, a message 2348. The message 2348 may comprise the QoE measurement report 2344. The message 2348 (e.g., comprising the QoE measurement report 2344) may be transmitted via an X2 or Xn interface. The message 2348 (e.g., comprising the QoE measurement report 2344) may be transmitted in an RRC transfer message. The RRC transfer message may be a message of X2 or Xn interface comprising at one of: an indicator/identifier (e.g., MeNB UE X2AP ID, SgNB UE X2AP ID) of the wireless device 2304 as assigned by a base station (e.g., an eNB, a gNB, the first base station 2308, or the second base station 2312); or an indicator/identifier (e.g., M-NG-RAN node UE XnAP ID, S-NG-RAN node UE XnAP ID) of the wireless device 2304 as assigned by a master access network (e.g., NG-RAN, the first base station 2308) node or secondary access network (e.g., NG-RAN, the second base station 2312) node, and/or the like.

The first base station 2308 of the wireless device 2304 may send the QoE measurement report 2344 to an MCE. The first base station 2308 of the wireless device 2304 may send the QoE measurement report 2344 to an MCE, for example, based on receiving the QoE measurement report 2344 from the second base station 2312 of the wireless device 2304. The QoE measurement report 2344 may be for the MCG of the wireless device.

The first base station 2308 may comprise at least one of: an eNB, a gNB, a NG-RAN, and/or the like. The second base station 2312 may comprise at least one of: an eNB, a gNB, a NG-RAN, and/or the like. The wireless device 2304 may communicate, with the first base station 2308 and/or the second base station 2312, packets based on at least one of: an EN-DC service, an NR-E-UTRA dual connectivity (NE-DC) service, an NR-DC service, a multi-radio dual connectivity (MR-DC) service, and/or the like.

Figure 24:
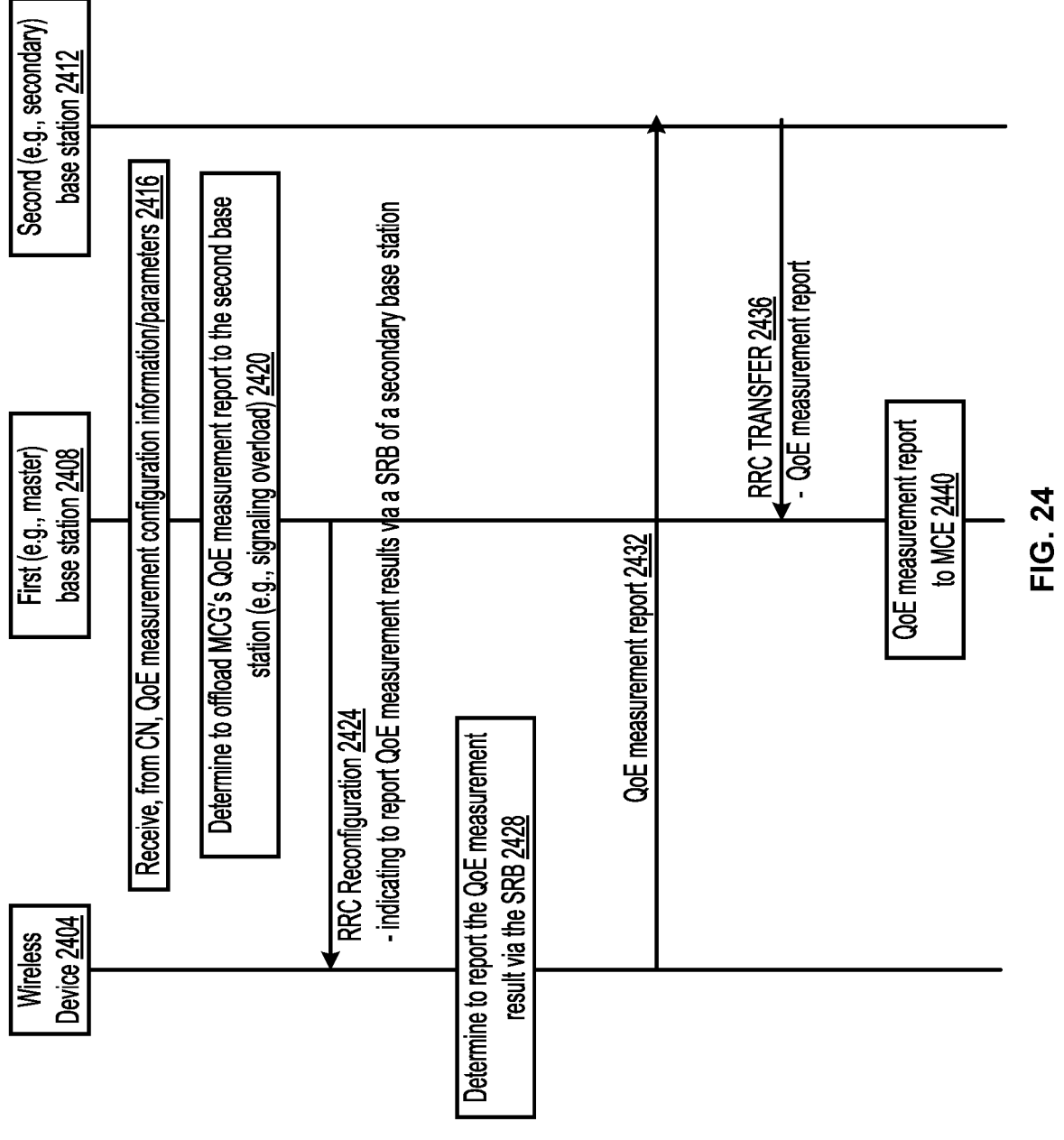
FIG. 24 show example QoE measurement.

FIG. 24 shows an example QoE measurement. A first base station 2408 (e.g., a master base station) may offload at least some QoE reporting processes to a second base station 2412 (e.g., a secondary base station). For example, the first base station 2408 may configure, for a wireless device 2404, QoE reporting via the second base station 2412. The second base station 2412 may receive a QoE measurement report, from the wireless device 2404, and send the QoE measurement report to the first base station 2408 (e.g., via a backhaul, wired interface, Xn interface, X2 interface, etc.). Use of a wired interface or a backhaul for transmission of the QoE measurement report may avoid overloading wireless resources associated with the first base station.

The first base station 2408 may receive (e.g., step 2416), from a CN node (e.g., AMF, SMF, MME), QoE measurement configuration parameters and/or information. The QoE measurement configuration parameters and/or information may be associated with the wireless device 2404. The first base station 2408 may receive the QoE measurement configuration parameters and/or information for the first base station 2408 and/or for the second base station 2412. The QoE measurement configuration parameters and/or information may be the same or different for the first base station 2408 and second base station 2412. The QoE measurement configuration parameters and/or information for the second base station 2412 may be for a secondary base station in a dual connectivity scenario. The QoE measurement configuration parameters and/or information may be received in one or more messages. The QoE measurement configuration parameters and/or information may be used for QoE measurement report for the wireless device 2404. The one or more messages may comprise at least one of: an indicator/identifier (e.g., MME UE S1AP ID) of the wireless device 2404 within/assigned by the MME, an indicator/identifier (e.g., AMF UE NGAP ID) of the wireless device within/assigned by the AMF, an indicator/identifier (e.g., eNB UE S1AP ID) of the wireless device as assigned by a base station (e.g., eNB, gNB, the first base station 2408, the second base station 2412), an indicator/identifier (e.g., RAN UE NGAP ID) of the wireless device within/assigned by a radio access network (e.g., NG-RAN, or the first base station 2308), and/or the like.

The first base station 2408 may trigger the wireless device 2404 to perform QoE measurement reporting (e.g., in an MCG of the first base station 2408) for one or more services (e.g., video steaming services) of the wireless device 2404. The wireless device 2404 may perform QoE measurement reporting, for example, based on the received QoE measurement configuration parameters and/or information.

The first base station 2408 may suffer from radio signaling overload (e.g., RRC signaling overload, etc.). The first base station 2408 may suffer from radio signaling overload, for example, if a large quantity of wireless devices, as connected to/associated with the first base station 2308, perform high bandwidth and/or overhead communications (e.g., receiving video streaming services, MTSI services, and/or other services). The wireless devices may perform QoE measurement and/or reporting. QoE measurement and reporting may be performed, for each service associated with a wireless device, causing consumption of signaling resources. The first base station 2308 may perform other radio signaling (e.g., RRC setup, RRC reconfiguration, RRC reestablishment, RRC resume, paging, etc.) for the associated wireless devices. The other radio signaling may have higher priority, at the first base station 2308, than the radio signaling associated with QoE measurement reporting. The first base station may, instead of pausing the QoE measurement reporting for one or more on-going services of the wireless device 2404, indicate to the wireless device 2404 to send the QoE measurement report for one or more on-going services of the wireless device to the second base station 2412 (e.g., the secondary base station) of the wireless device.

The first base station 2408 may determine (e.g., step 2420) to offload QoE measurement reporting (e.g., for the MCG) to the second base station 2412 (e.g., based on signaling overload, performing other radio signaling with higher priority). The first base station 2408 may send, to the wireless device 2412, a message 2424 (e.g., an RRC message, such as an RRC reconfiguration message) comprising an indication to report QoE measurement results to the second base station 2412. The first base station 2408 may send, to the wireless device 2412, a message 2424 comprising an indication to report QoE measurement results, to the second base station 2412, via a particular radio resource (e.g., SRB or type of SRB) of the second base station 2412. The indication to report the QoE measurement results may indicate an SRB of the second base station 2412 (e.g., SRB3, SRB4, SRB5, and/or any other SRB of the second base station 2412). The SRB may be for transmission, by the wireless device 2404 to the second base station 2412, of QoE measurement reporting. The QoE measurement results may be associated with a cell group (e.g., an MCG) of the first base station 2408.

The wireless device 2404 may receive, from the first base station 2408, the message 2424 (e.g., an RRC message) comprising an indication to report QoE measurement results (e.g., of one or more service types) via a particular SRB or type of SRB of the second base station 2412. The message 2424 may comprise an indication of not pausing the QoE measurement reporting of on-going one or more service types of the wireless device 2404. The message 2424 may further comprise/indicate one or more service types associated with the indications, an indicator/identifier (e.g., an RRC identifier) of the wireless device 2404, and/or the like. The service type may indicate at least one of: a streaming service, an MTSI service, a VR service, an XR service, an MBMS, an MBS, and/or the like.

The wireless device 2404 may determine (e.g., step 2428), based on the message 2424, to report the QoE measurement results to the second base station 2412. The wireless device 2404 may determine to report the QoE measurement results to the second base station 2412, for example, via the type of the SRB of the second base station 2412 for the wireless device 2404. The wireless device 2404 may send, to the second base station 2412, QoE measurement results (e.g., QoE measurement report 2432) via the type of the SRB of the second base station 2412. The QoE measurement results 2432 may comprise QoE measurement results of the MCG.

The indication to report the QoE measurement results may indicate a particular SRB or type of SRB for QoE measurement reporting. The type of the SRB may comprise at least one of: an SRB3, an SRB4, an SRB5 (e.g., combination of SRB3 and SRB4), and/or the like. SRB3 may be for RRC messages for example if the wireless device 2404 is in one or more scenarios/configurations (e.g., EN-DC, NGEN-DC (, or NR-DC using DCCH logical channel). SRB4 may be for RRC messages which may comprise application layer measurement report information using DCCH logical channel. SRB4 may be configured by the network after AS security activation. SRB5 may be a combination of SRB3 and SRB4.

The SRB may be for communication of an RRC message via the second base station 2412 of the wireless device 2404. The RRC message may comprise at least one measurement report application layer message. The measurement report application layer message may comprise at least one of: a measurement configuration application layer indicator/identifier, a measurement report application layer container, and/or the like.

The measurement report application layer container may comprise/indicate application layer measurement results for at least one of: an average throughput of streaming services and/or VR services, an initial playout delay of streaming services and/or VR services, a buffer level status of streaming services and/or VR services, a list of playback periods (e.g., a play list) of streaming services and/or VR services, a successive loss of real-time transport protocol packets of MTSI services, a frame rate of MTSI services, a jitter duration of MTSI services, a sync loss duration of MTSI services, a round-trip time of MTSI services, an average codec bitrate of MTSI services, a call setup time for MTSI service of MTSI services, a comparable quality viewport switching latency of VR services, a list of viewports that have been rendered during the media presentation of VR services, and/or the like. The measurement report application layer container may comprise/indicate measurement results associated with one or more other services.

The second base station 2412 of the wireless device 2404, based on receiving the QoE measurement report 2432 from the wireless device 2404, may send/transmit a message 2344 (e.g., comprising the QoE measurement report 2344) to the first base station 2408 of the wireless device 2404. The second base station 2412 may send/transmit the message 2344, to the first base station 2408, via X2 or Xn interface. The X2 or Xn message may be a RRC transfer message (e.g., or any other message, any other RRC message, etc.). The RRC transfer message may be a message of X2 or Xn interface comprising at one of: an indicator/identifier (e.g., MeNB UE X2AP ID, SgNB UE X2AP ID) of the wireless device as assigned by a base station (e.g., an eNB, gNB, the first base station 2408, the second base station 2412); or an indicator/identifier (e.g., M-NG-RAN node UE XnAP ID, S-NG-RAN node UE XnAP ID) of the wireless device within/assigned by master access network (e.g., NG-RAN, the first base station 2408) node or secondary access network (e.g., NG-RAN, the second base station 2412) node, and/or the like.

The first base station 2408 may send the QoE measurement report 2432 to an MCE. The first base station 2408 may send the QoE measurement report 2432 to the MCE, for example, based on receiving the QoE measurement report 2432 from the second base station 2412. The QoE measurement report 2432 may be for the MCG of the wireless device 2404.

Similar to FIG. 23, the first base station 2408 and the second base station 2412 may perform communication to configure QoE measurement reporting via the second base station 2412. The first base station 2408 may send an indication (e.g., similar to indication 2324), to the second base station 2412, to request QoE measurement reporting for the wireless device 2404 via the second base station 2412.

The second base station 2412 may determine (e.g., similar to step 2328) to receive QoE measurement reporting of the wireless device 2404. The determining may be based on receiving, from the first base station 2408, of the indication to request QoE measurement reporting via the second base station 2412. The second base station 2412 may send, to the first base station 2408, an indication (e.g., similar to indication 2332) of whether the QoE measurement reporting of the wireless device 2404 is available or not available, supported or not supported, etc. The first base station 2408 may send the message 2424, for example, based on receiving an indication, from the second base station 2412, that the QoE measurement reporting of the wireless device 2404 is available and supported.

The first base station 2408 may comprise at least one of: an eNB, a gNB, a NG-RAN, and/or the like. The second base station 2412 may comprise at least one of: an eNB, a gNB, a NG-RAN, and/or the like. The wireless device 2404 may communicate, with the first base station 2408 and/or the second base station 2412, packets based on at least one of: an EN-DC service, an NE-DC service, an NR-DC service, an MR-DC service, and/or the like.

Figure 25:
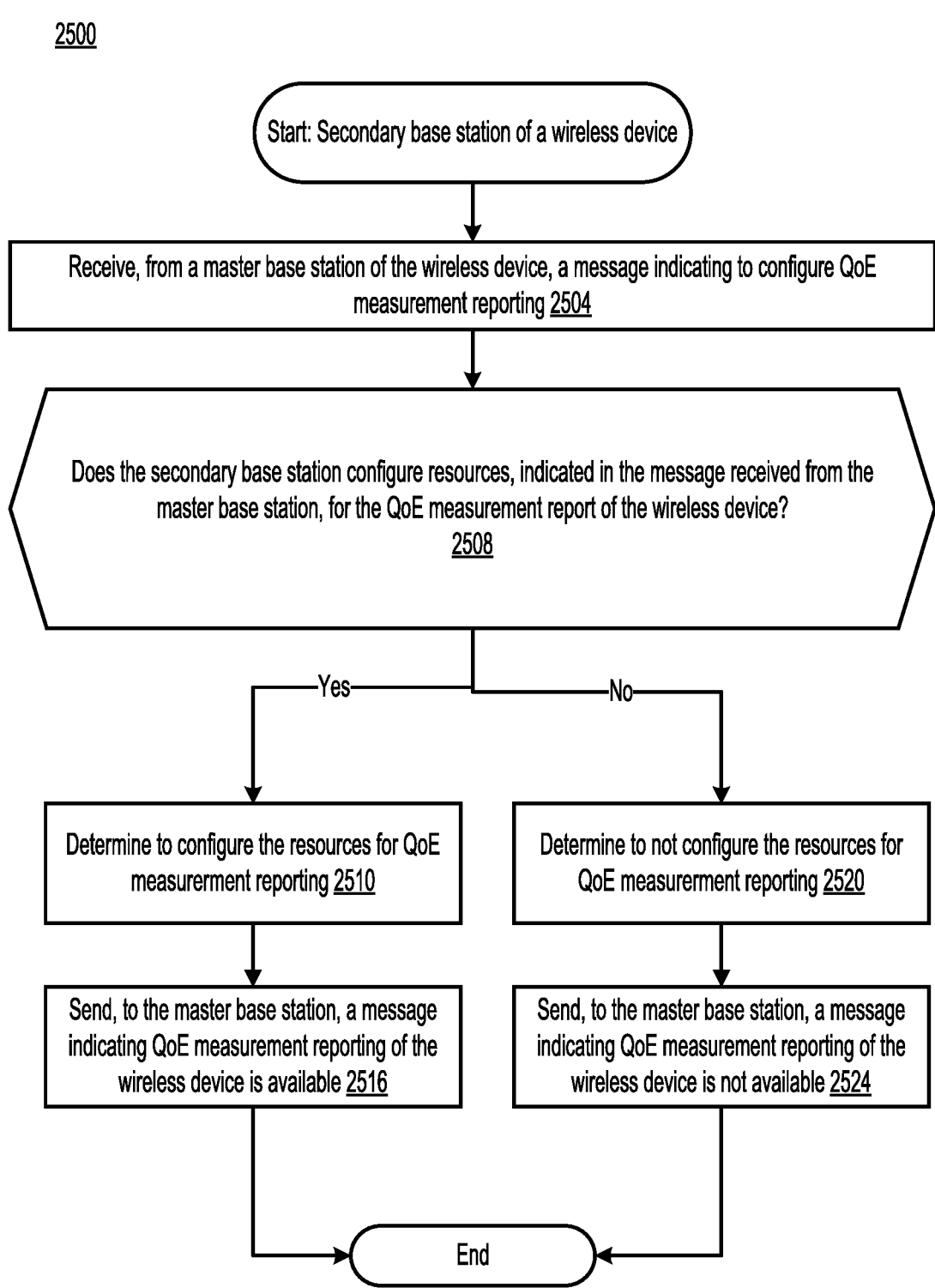
FIG. 25 shows an example method for configuring QoE reporting via a secondary base station.

FIG. 25 shows an example method for configuring QoE reporting via a secondary base station. The example method 2500 may be performed at a secondary base station (e.g., the second base station 2312, 2412). At step 2504, the secondary base station may receive, from a master base station (e.g., the first base station 2308, 2408) of the wireless device, a message indicating/requesting the secondary base station to configure QoE measurement reporting. The message may indicate/request the secondary base station to configure QoE measurement reporting via one or more resources (e.g., SRBs, a type of SRB).

At step 2508, the secondary base station may determine if the secondary base station may configure resources (e.g., one or more SRBs of the secondary base station) for the QoE measurement reporting of the wireless device. The resources may be indicated via the message as received at step 2504. For example, the secondary base station may determine whether to configure SRB3 and/or SRB4 for QoE measurement reporting of the wireless device. The secondary base station may determine to configure resources for the QoE measurement reporting for the wireless device, for example, based on the resources being available at the secondary base station, the QoE measurement reporting being supported by the secondary base station, etc. The secondary base station may determine to not configure resources for the QoE measurement reporting for the wireless device, for example, based on the resources not being available and/or supported at the secondary base station, the QoE measurement reporting not being supported by the secondary base station, etc.

At step 2510, the secondary base station may (e.g., determine to) configure the resources (e.g., one or more SRBs of the secondary base station) for the QoE measurement reporting of the wireless device. At step 2516, the secondary base station may send, to the master base station, a message indicating that QoE measurement reporting (e.g., via the resources) for the wireless device is available. The secondary base station may send, to the master base station, a message indicating that QoE measurement reporting (e.g., via the resources) for the wireless device is available, for example, based on determining to configure the resources for the QoE measurement reporting of the wireless device.

At step 2520, the secondary base station may not (e.g., determine not to) configure the resources (e.g., one or more SRBs of the secondary base station) for the QoE measurement reporting of the wireless device. At step 2524, the secondary base station may send, to the master base station, a message indicating that QoE measurement reporting (e.g., via the resources) for the wireless device is not available. The secondary base station may send, to the master base station, a message indicating that QoE measurement reporting (e.g., via the resources) for the wireless device is not available, for example, based on determining to not configure the resources for the QoE measurement reporting of the wireless device. The secondary base station may send, to the master base station, a message indicating that QoE measurement reporting (e.g., via the resources) for the wireless device is not available, for example, based on the resources not being supported at the secondary base station, the resources not being available at the secondary base station, QoE measurement reporting not being supported by the secondary base station, etc. The message indicating that QoE measurement reporting for the wireless device is not available may comprise a cause value indicating a reason for which QoE measurement reporting, via the secondary base station, for the wireless device is not available.

Figure 26:
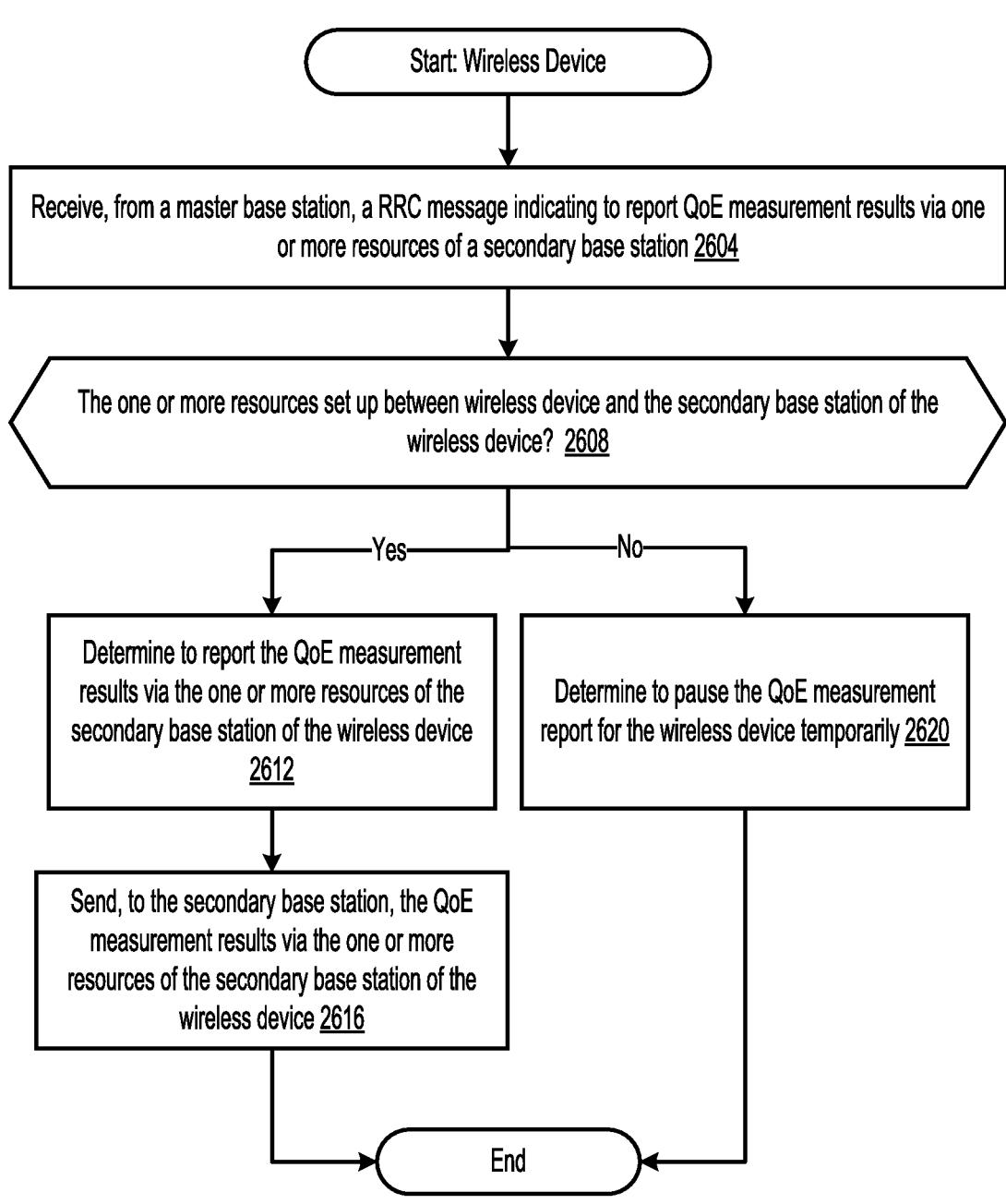
FIG. 26 shows an example method of QoE reporting.

FIG. 26 shows an example method of QoE reporting. The example method 2600 may be performed at a wireless device (e.g., the wireless device 2304, 2404). At step 2604, the wireless device may receive, from a master base station (e.g., the first base station 2308, 2408), a message (e.g., an RRC message) indicating/requesting the wireless device to report QoE measurement results via one or more resources (e.g., one or more SRBs, SRB3, SRB4, any other SRB) of/associated with a secondary base station (e.g., the second base station 2312, 2412).

At step 2608, the wireless device may determine whether the one or more resources have been set up/configured for communication between the wireless device and the secondary base station. For example, the wireless device may determine whether the secondary base station has configured one or more SRBs (e.g., SRB3, SRB4, etc.) for QoE measurement reporting by the wireless device.

At step 2612, the wireless device may determine to report QoE measurement results via the one or more resources of the secondary base station of the wireless device, for example, based on the one or more resources having been configured between the wireless device and the secondary base station. At step 2616, the wireless device may send, to the secondary base station, the QoE measurement results via the one or more resources of the secondary base station of the wireless device. At step 2620, the wireless device may determine to pause QoE measurement reporting via the one or more resources of the secondary base station of the wireless device, for example, based on the one or more resources not having been configured between the wireless device and the secondary base station.

A second base station may receive, from a first base station, a first message indicating/requesting the second base station to configure QoE measurement reporting. The first message may indicate/request the second base station to configure QoE measurement reporting via a first type of a SRB for a wireless device.

The second base station may determine, to configure the SRB for the QoE measurement reporting for the wireless device. The second base station may send, to the first base station, a second message indicating that the QoE measurement reporting via the SRB of the wireless device is available. The first base station may be a master base station of the wireless device. The second base station may be a secondary base station of the wireless device.

The first message may comprise at least one of: a secondary node addition request message for a dual connectivity of the wireless device, a secondary node modification request message for the dual connectivity of the wireless device, and/or the like. The QoE measurement reporting may be for a MCG of the wireless device.

The first message may comprise measurement configuration parameters comprising at least one of: a container for application layer measurement configuration, a measurement configuration application layer indicator/identifier, a list of cell indicators/identifiers for a QoE measurement report, a list of TAIs for QoE measurement report, a list of PLMNs for QoE measurement report, a service type to perform QoE measurement report for the wireless device, a QoE reference, a measurement collection entity IP address, a list of S-NSSAIs, and/or the like.

The service type may comprise/indicate at least one of: a streaming service, an MTSI service, a VR service, an XR service, an MBMS, and/or the like. The application layer measurement configuration parameters may comprise/indicate at least one of: an average throughput of streaming services and/or VR services, an initial playout delay of streaming services and/or VR services, a buffer level status of streaming services and/or VR services, a list of playback periods (e.g., a play list) of streaming services and/or VR services, a successive loss of real-time transport protocol packets of MTSI services, a frame rate of MTSI services, a jitter duration of MTSI services, a sync loss duration of MTSI services, a round-trip time of MTSI services, an average codec bitrate of MTSI services, a call setup time for MTSI service of MTSI services, a comparable quality viewport switching latency of VR services, a list of viewports that have been rendered during the media presentation of VR services, and/or the like.

The first type of the SRB may comprise at least one of: an SRB3, an SRB4, an SRB5 (e.g., combination of SRB3 and SRB4), and/or the like. The SRB may be for communication of an RRC message via the second base station (e.g., the secondary base station) of the wireless device.

The RRC message may comprise at least one measurement report application layer message. The measurement report application layer message may comprise/indicate at least one of: a measurement configuration application layer identifier, a measurement report application layer container, and/or the like. The measurement report application layer container may comprise/indicate application layer measurement results for at least one of: an average throughput of streaming services and/or VR services, an initial playout delay of streaming services and/or VR services, a buffer level status of streaming services and/or VR services, a list of playback periods (e.g., a play list) of streaming services and/or VR services, a successive loss of real-time transport protocol packets of MTSI services, a frame rate of MTSI services, a jitter duration of MTSI services, a sync loss duration of MTSI services, a round-trip time of MTSI services, an average codec bitrate of MTSI services, a call setup time for MTSI service of MTSI services, a comparable quality viewport switching latency of VR services, a list of viewports that have been rendered during the media presentation of VR services, and/or the like.

The second base station may determine, based on the first message, RRC measurement configuration parameters for the wireless device. The second base station may send, to the wireless device, the RRC measurement configuration parameters via the SRB. The RRC measurement configuration parameters may comprise/indicate at least one of: a container for application layer measurement configuration, a measurement configuration application layer identifier, an RRC identifier of the wireless device, a service type to perform QoE measurement reporting of the wireless device, a QoE reference, a list of S-NSSAIs, and/or the like. The service type may comprise/indicate at least one of: a streaming service, an MTSI service, a VR service, an XR service, an MBMS, an MBS, and/or the like. The application layer measurement configuration parameters may comprise/indicate at least one of: an average throughput of streaming services and/or VR services, an initial playout delay of streaming services and/or VR services, a buffer level status of streaming services and/or VR services, a list of playback periods (e.g., a play list) of streaming services and/or VR services, a successive loss of real-time transport protocol packets of MTSI services, a frame rate of MTSI services, a jitter duration of MTSI services, a sync loss duration of MTSI services, a round-trip time of MTSI services, an average codec bitrate of MTSI services, a call setup time for MTSI service of MTSI services, a comparable quality viewport switching latency of VR services, a list of viewports that have been rendered during the media presentation of VR services, and/or the like.

The second message may comprise/indicate at least one of: a secondary node addition request acknowledge message for a dual connectivity of the wireless device, a secondary node modification request acknowledge message for the dual connectivity of the wireless device, and/or the like. The first base station may comprise at least one of: an eNB, a gNB, a NG-RAN, and/or the like. The second base station may comprise at least one of: an eNB, a gNB, a NG-RAN, and/or the like. The wireless device may communicate, with the first base station and/or the second base station, packets based on at least one of: an EN-DC service, am NE-DC service, an NR-DC service, an MR-DC service, and/or the like.

The second base station may determine to not configure the SRB for the QoE measurement reporting of the wireless device. The second base station may send, to the first base station, a second message indicating that the QoE measurement reporting via the SRB of the wireless device is not available. The second message may comprise a cause value comprising/indicating at least one of: not supporting the first type of the SRB, signaling overload at the second base station (e.g., the secondary base station of the wireless device), temporarily non-availability of the first type of the SRB, and/or the like.

The first base station may receive from a core network node (e.g., AMF, SMF, MME), a fourth message comprising/indicating QoE configuration information of the wireless device. The first message may be based on the QoE configuration information.

The second base station may receive from the wireless device, via the SRB, a QoE measurement report of an MCG. The second base station may send, to the first base station, a third message comprising QoE measurement results of an MCG for the wireless device. The third message may comprise an RRC transfer message comprising the QoE measurement results of the MCG.

A wireless device may receive, from a first base station for the wireless device, an RRC message. The RRC message may comprise an indication to report QoE measurement results. The RRC message may comprise an indication to report QoE measurement results via a first type of a signaling radio bearer (SRB) of a second base station for the wireless device. The wireless device may determine, based on the indication, to report the QoE measurement results via the first type of the SRB of the second base station for the wireless device. The wireless device may send, to the second base station, the QoE measurement results via the first type of the SRB of the second base station.

The first base station may be a master base station of the wireless device. The second base station may be a secondary base station of the wireless device, and/or the like.

The second base station may send, to the first base station, a third message comprising the QoE measurement results of an MCG for the wireless device. The first base station may serve (e.g., operate, provide) the MCG for the wireless device. The third message may comprise a RRC transfer message comprising the QoE measurement results of the MCG.

A second base station may perform a method comprising multiple operations. The second base station may receive, from a first base station, a first message requesting configuration of quality of experience (QoE) measurement reporting for a wireless device. The second base station may send, to the first base station, a second message acknowledging that the QoE measurement reporting for the wireless device is available. The second base station may also perform one or more additional operations. The second base station may determine, based on the first message, QoE measurement configuration parameters for the wireless device. The second base station may send, to the wireless device, the QoE measurement configuration parameters. The QoE measurement configuration parameters may comprise/indicate at least one of: a container for application layer measurement configuration; a measurement configuration application layer identifier; a radio resource control (RRC) identifier of the wireless device; a service type to perform QoE measurement report of the wireless device; a QoE reference; or a list of single network slice selection assistance information (S-NSSAIs). The service type may comprise at least one of: a streaming service; a multimedia telephony service for internet protocol multimedia system (MTSI) service; a virtual reality (VR) service; an extended reality (XR) service; a multimedia broadcast and multicast service (MBMS); or a multicast broadcast service (MBS). The application layer measurement configuration may comprise configuration parameters for measurement of at least one of: an average throughput of streaming services or virtual reality (VR) services; an initial playout delay of streaming services or VR services; a buffer level status of streaming services or VR services; a list of playback periods of streaming services or VR services; a successive loss of real-time transport protocol packets of multimedia telephony service for internet protocol multimedia system (MTSI) services; a frame rate of MTSI services; a jitter duration of MTSI services; a sync loss duration of MTSI services; a round-trip time of MTSI services; an average codec bitrate of MTSI services; a call setup time for MTSI service of MTSI services; a comparable quality viewport switching latency of VR services; or a list of viewports that have been rendered during the media presentation of VR services. The second base station may receive, from the wireless device, a QoE measurement report. The second base station may receive, from the wireless device, a QoE measurement report, associated with a cell group of the first base station, via a signaling radio bearer (SRB) of the second base station. The second base station may send, to the first base station, a third message comprising a QoE measurement report of the wireless device. The third message may comprise a radio resource control (RRC) transfer message. The QoE measurement report may be associated with a master cell group (MCG) of the wireless device. The sending the second message acknowledging that the QoE measurement reporting for the wireless device is available may comprise sending the second message based on configuring radio resources for the QoE measurement reporting for the wireless device. The sending the second message acknowledging that the QoE measurement reporting for the wireless device is available comprises sending the second message based on radio resources for the QoE measurement reporting being available at the wireless device. The first base station may be a master base station of the wireless device. The second base station may be a secondary base station of the wireless device. The sending the second message may comprise sending the second message at a first time period. The second base station may send, to the first base station at a second time period, a third message indicating that the QoE measurement reporting for the wireless device is not available. The third message may comprise a cause value indicating at least one of: a signaling resource block (SRB) type for QoE measurement reporting not being supported; a signaling overload at the second base station; or temporarily non-availability of the SRB type for QoE measurement reporting. The sending the second message acknowledging that the QoE measurement reporting for the wireless device is available may comprise sending the second message acknowledging that the QoE measurement reporting for the wireless device, via a signaling radio bearer (SRB), is available. The SRB may comprise at least one of: an SRB3; an SRB4; an SRB5; or a combination of two or more SRBs. The SRB may be for communication of a radio resource control (RRC) message via the second base station of the wireless device. The second base station may receive a radio resource control (RRC) message comprising a QoE measurement report. The QoE measurement report may comprise at least one measurement report application layer message. The at least one measurement report application layer message may comprise at least one of: a measurement configuration application layer identifier; or a measurement report application layer container. The measurement report application layer container may comprise application layer measurement results for at least one of: an average throughput of streaming services or virtual reality (VR) services; an initial playout delay of streaming services or VR services; a buffer level status of streaming services or VR services; a list of playback periods of streaming services or VR services; a successive loss of real-time transport protocol packets of multimedia telephony services for internet protocol multimedia system (MTSI) services; a frame rate of MTSI services; a jitter duration of MTSI services; a sync loss duration of MTSI services; a round-trip time of MTSI services; an average codec bitrate of MTSI services; a call setup time for MTSI services; a comparable quality viewport switching latency of VR services; or a list of viewports that have been rendered during the media presentation of VR services. The first message may comprise at least one of: a secondary node addition request message for a dual-connectivity of the wireless device; or a secondary node modification request message for the dual-connectivity of the wireless device. The QoE measurement reporting may be for a master cell group (MCG) of the wireless device. The first message may comprise/indicate QoE measurement configuration parameters comprising at least one of: a container for application layer measurement configuration; a measurement configuration application layer identifier; a list of cell identifiers for QoE measurement report; a list of tracking area identities (TAIs) for QoE measurement report; a list of public land mobile networks (PLMNs) for QoE measurement report; a service type to perform QoE measurement report for the wireless device; a QoE reference; a measurement collection entity IP address; or a list of single network slice selection assistance information (S-NSSAIs). The service type may comprise at least one of: a streaming service; a multimedia telephony service for internet protocol multimedia system (MTSI) service; a virtual reality (VR) service; an extended reality (XR) service; or a multimedia broadcast and multicast service (MBMS). The application layer measurement configuration comprises configuration parameters for measurement of at least one of: an average throughput of streaming services or virtual reality (VR) services; an initial playout delay of streaming services or VR services; a buffer level status of streaming services or VR services; a list of playback periods of streaming services or VR services; a successive loss of real-time transport protocol packets of multimedia telephony service for internet protocol multimedia system (MTSI) services; a frame rate of MTSI services;

a jitter duration of MTSI services; a sync loss duration of MTSI services; a round-trip time of MTSI services; an average codec bitrate of MTSI services; a call setup time for MTSI services; a comparable quality viewport switching latency of VR services; or a list of viewports that have been rendered during the media presentation of VR services. The second message may comprise at least one of: a secondary node addition request acknowledge message for a dual-connectivity of the wireless device; or a secondary node modification request acknowledge message for the dual-connectivity of the wireless device. The first base station may comprise at least one of: an evolved NodeB (eNB); a gNB; or a next generation-radio access network (NG-RAN). The second base station may comprise at least one of: an evolved NodeB (eNB); a gNB; or a next generation-radio access network (NG-RAN). The wireless device may communicate, with the first base station or the second base station, based on at least one of: evolved-universal terrestrial radio access (E-UTRA) new radio (NR) dual connectivity (EN-DC) service; NR-E-UTRA dual connectivity (NE-DC) service; NR-NR dual connectivity (NR-DC) service; or multi-radio dual connectivity (MR-DC) service. The second base station may comprise one or more processors; and memory storing instructions that, when executed by the one or more processors, cause the base station to perform the described method, additional operations and/or include the additional elements. A system may comprise a second base station configured to perform the described method, additional operations and/or include the additional elements; and a first base station configured to send the first message. A computer-readable medium may store instructions that, when executed, cause performance of the described method, additional operations and/or include the additional elements.

A first base station may perform a method comprising multiple operations. The first base station may send, to a second base station, a first message requesting configuration of quality of experience (QoE) measurement reporting for a wireless device. The first base station may receive, from the second base station, a second message acknowledging that the QoE measurement reporting for the wireless device is available. The first base station may also perform one or more additional operations. The first base station may receive, from the second base station, a third message comprising a QoE measurement report of the wireless device. The QoE measurement report may be associated with a cell group of the first base station. The first base station may receive, from the second base station via at least one of an X2 or an Xn interface, a fourth message comprising a QoE measurement report of the wireless device. The first base station may receive, from a core network node, a fifth message comprising QoE measurement configuration parameters for the wireless device. The first message may be based on the QoE measurement configuration parameters. The first base station may receive, from the second base station, a sixth message comprising a QoE measurement report of the wireless device. The first base station may send, to a measurement collection entity, the QoE measurement report. The first base station may be a master base station of the wireless device. The second base station may be a secondary base station of the wireless device. The first base station may comprise one or more processors; and memory storing instructions that, when executed by the one or more processors, cause the first base station to perform the described method, additional operations and/or include the additional elements. A system may comprise the first base station configured to perform the described method, additional operations and/or include the additional elements; and the second base station configured to send the second message. A computer-readable medium may store instructions that, when executed, cause performance of the described method, additional operations and/or include the additional elements.

A wireless device may perform a method comprising multiple operations. The wireless device may receive, from a first base station, a message comprising an indication to send a quality of experience (QoE) measurement report via at least one radio resource of a second base station. The wireless device may send, to the second base station, the QoE measurement report via the at least one radio resource of the second base station. The wireless device may also perform one or more additional operations. The sending the QoE measurement report via the at least one radio resource of the second base station may comprise sending the QoE measurement report based on determining that the second base station has configured the at least one radio resource for QoE measurement reporting. The first base station may be a master base station of the wireless device. The second base station may be a secondary base station of the wireless device. The at least one radio resource may comprise a signaling radio bearer (SRB). The message may comprise an indication of a service type associated with the QoE measurement report. The service type may comprise at least one of: a streaming service; a multimedia telephony service for internet protocol multimedia system (MTSI) service; a virtual reality (VR) service; an extended reality (XR) service; a multimedia broadcast and multicast service (MBMS); or a multicast broadcast service (MBS). The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a first base station configured to send the message. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   sending, by a first base station to a second base station, a first message requesting configuration of quality of experience (QoE) measurement reporting for a wireless device, wherein the first message comprises an indication of a signaling radio bearer (SRB); and
   receiving, from the second base station, a second message acknowledging that the QoE measurement reporting for the wireless device is available via the indicated SRB.

2. The method of claim 1, further comprising receiving, from the second base station, a third message comprising a QoE measurement report of the wireless device, wherein the QoE measurement report is associated with a cell group of the first base station.

3. The method of claim 1, further comprising receiving, from the second base station via at least one of an X2 or an Xn interface, a third message comprising a QoE measurement report of the wireless device.

4. The method of claim 1, further comprising receiving, from a core network node, a third message comprising QoE measurement configuration parameters for the wireless device, wherein the first message is based on the QoE measurement configuration parameters.

5. The method of claim 1, further comprising:

receiving, from the second base station, a third message comprising a QoE measurement report of the wireless device; and sending, to a measurement collection entity, the QoE measurement report.

6. The method of claim 1, wherein:

the first base station is a master base station of the wireless device; and the second base station is a secondary base station of the wireless device.

7. A method comprising:

receiving, by a second base station from a first base station, a first message requesting configuration of quality of experience (QoE) measurement reporting for a wireless device, wherein the first message comprises an indication of a signaling radio bearer (SRB); and sending, to the first base station, a second message acknowledging that the QoE measurement reporting for the wireless device is available via the indicated SRB.

8. The method of claim 7, further comprising:

determining, based on the first message, QoE measurement configuration parameters for the wireless device; and sending, to the wireless device, the QoE measurement configuration parameters.

9. The method of claim 7, further comprising receiving, from the wireless device, a QoE measurement report.

10. The method of claim 7, further comprising receiving, from the wireless device, a QoE measurement report, associated with a cell group of the first base station, via the indicated SRB.

11. The method of claim 7, further comprising sending, to the first base station, a third message comprising a QoE measurement report of the wireless device.

12. The method of claim 7, wherein the sending the second message acknowledging that the QoE measurement reporting for the wireless device is available via the indicated SRB comprises sending the second message based on configuring the indicated SRB for the QoE measurement reporting for the wireless device.

13. The method of claim 7, wherein the sending the second message acknowledging that the QoE measurement reporting for the wireless device is available via the indicated SRB comprises sending the second message based on the indicated SRB being available.

14. The method of claim 7, wherein:

the first base station is a master base station of the wireless device; and the second base station is a secondary base station of the wireless device.

15. The method of claim 7, wherein the sending the second message comprises sending the second message at a first time period, and wherein the method further comprises:

sending, to the first base station at a second time period, a third message indicating that the QoE measurement reporting for the wireless device is not available.

16. A method comprising:

receiving, by a wireless device from a first base station, a message comprising an indication to send a quality of experience (QoE) measurement report via a signaling radio bearer (SRB) of a second base station; and sending, by the wireless device to the second base station, the QoE measurement report via the SRB of the second base station.

17. The method of claim 16, wherein the sending the QoE measurement report via the SRB of the second base station comprises sending the QoE measurement report based on determining that the second base station has configured the SRB for QoE measurement reporting.

18. The method of claim 16, wherein:

the first base station is a master base station of the wireless device; and the second base station is a secondary base station of the wireless device.

19. The method of claim 16, wherein the message comprises an indication of a service type associated with the QoE measurement report, wherein the service type comprises at least one of:

a streaming service;

a multimedia telephony service for internet protocol multimedia system (MTSI) service;

a virtual reality (VR) service;

an extended reality (XR) service;

a multimedia broadcast and multicast service (MBMS); or a multicast broadcast service (MBS).

20. The method of claim 16, further comprising receiving, by the wireless device, QoE measurement configuration parameters.

* * * * *